United States Patent
Wang et al.

(10) Patent No.: US 11,831,446 B2
(45) Date of Patent: Nov. 28, 2023

(54) METHOD AND APPARATUS FOR TRANSMITTING HARQ-ACK/NACK IN WIRELESS COMMUNICATION SYSTEM

(71) Applicant: Samsung Electronics Co., Ltd., Gyeonggi-do (KR)

(72) Inventors: Yi Wang, Beijing (CN); Yingyang Li, Beijing (CN); Shichang Zhang, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/476,774

(22) PCT Filed: Jan. 5, 2018

(86) PCT No.: PCT/KR2018/000282
§ 371 (c)(1),
(2) Date: Jul. 9, 2019

(87) PCT Pub. No.: WO2018/128474
PCT Pub. Date: Jul. 12, 2018

(65) Prior Publication Data
US 2019/0363840 A1    Nov. 28, 2019

(30) Foreign Application Priority Data

Jan. 9, 2017 (CN) .......................... 201710013439.1
Jan. 18, 2017 (CN) .......................... 201710035080.8
(Continued)

(51) Int. Cl.
*H04L 1/1829* (2023.01)
*H04W 72/21* (2023.01)

(52) U.S. Cl.
CPC ........... *H04L 1/1861* (2013.01); *H04W 72/21* (2023.01)

(58) Field of Classification Search
CPC ..................................................... H04L 1/1861
See application file for complete search history.

(56) References Cited

U.S. PATENT DOCUMENTS

2015/0009897 A1* 1/2015 Wilhelmsson ........ H04L 1/0007
370/328
2015/0131494 A1    5/2015 He et al.
(Continued)

FOREIGN PATENT DOCUMENTS

CN       102223215       10/2011
CN       102377548       3/2012
(Continued)

OTHER PUBLICATIONS

PCT/ISA/210 Search Report issued on PCT/KR2018/00082, pp. 15.
(Continued)

*Primary Examiner* — Edan Orgad
*Assistant Examiner* — Won Tae C Kim
(74) *Attorney, Agent, or Firm* — The Farrell Law Firm, P.C.

(57) ABSTRACT

The present disclosure relates to a method and an apparatus of transmitting a hybrid automatic repeat request-acknowledgement/negative acknowledgement (HARQ-ACK/NACK). A first set of HARQ-ACK/NACK including at least one timing value is identified. The at least one HARQ-ACK/NACK timing value is a time difference between a downlink time unit in which a physical downlink shared channel (PDSCH) is received and an uplink time unit in which a HARQ-ACK/NACK associated with the PDSCH is transmitted. A second set including at least one downlink time associated with a HARQ-ACK/NACK feedback is determined based on the first set. A codebook for the HARQ-ACK/NACK is generated based on a size of the codebook. The size of the codebook is identified based on the second set including the at least one downlink time. The codebook
(Continued)

for the HARQ-ACK/NACK is transmitted to the base station in the uplink time unit.

14 Claims, 15 Drawing Sheets

(30) Foreign Application Priority Data

Sep. 11, 2017 (CN) .......................... 201710812599.2
Sep. 29, 2017 (CN) .......................... 201710910258.9

(56) References Cited

U.S. PATENT DOCUMENTS

| | | | |
|---|---|---|---|
| 2015/0195062 A1* | 7/2015 | Hwang | H04L 1/1607 370/329 |
| 2016/0099799 A1* | 4/2016 | Bashar | H04L 1/1893 370/280 |
| 2016/0198450 A1* | 7/2016 | Wei | H04W 72/02 370/329 |
| 2017/0134140 A1* | 5/2017 | Park | H04L 1/0046 |
| 2018/0006791 A1* | 1/2018 | Marinier | H04L 1/1893 |
| 2018/0077698 A1* | 3/2018 | Takeda | H04L 5/001 |
| 2018/0376490 A1* | 12/2018 | Lunttila | H04W 72/1268 |
| 2019/0260515 A1* | 8/2019 | Tang | H04W 72/0413 |
| 2020/0052836 A1* | 2/2020 | Li | H04L 5/1469 |
| 2020/0322098 A1* | 10/2020 | Lei | H04L 1/08 |
| 2020/0344710 A1* | 10/2020 | Sundberg | H04W 56/0045 |
| 2021/0281367 A1* | 9/2021 | Zhang | H04L 1/0005 |

FOREIGN PATENT DOCUMENTS

| | | |
|---|---|---|
| CN | 104396174 | 3/2015 |
| CN | 105580303 | 5/2016 |
| CN | 106301670 | 1/2017 |
| EP | 2 863 686 | 4/2015 |
| WO | WO 2015/024215 | 2/2015 |
| WO | WO 2016/163758 | 10/2016 |
| WO | WO 2016/198734 | 12/2016 |
| WO | WO-2017078782 A1 * | 5/2017 |

OTHER PUBLICATIONS

PCT/ISA/237 Written Opinion issued on PCT/KR2018/000282, pp. 8.
IMT.BEYOND2020.TRAFFIC, Radiocommunication Study Groups, International Telecommunication Union, Document 5D/TEMP/466-E, Oct. 21, 2014, pp. 36.
ITU-R Radiocommunication Sector of ITU, Recommendation ITU-R M.2083-0, Sep. 2015 . . . IMT Vision—Framework and overall objectives of the future development of IMT for 2020 and beyond, Copyright ITU 2015, pp. 22.
ITU-R Radiocommunication Sector of ITU, Report ITU-R M.2320-0, Nov. 2014, Future technology trends of terrestrial IMT systems, Copyright ITU 2015, pp. 32.
Lenovo, 3GPP TSG RAN WG1 Meeting #83, R1-156729, Anaheim, USA, Nov. 15-22, 2015, "HARQ-ACK codebook adaptation for Rel-13 eCA", pp. 4.
CATT, 3GPP TSG RAN WG1 Meeting #87, R1-1611360, Reno, USA, Nov. 14-18, 2016, "Explicit HARQ and scheduling timing design for LTE sTTI", pp. 3.
CATT, 3GPP TSG RAN WG1 Meeting #86bis, R1-1608740, Lisbon, Portugal Oct. 10-14, 2016, "Remaining issues for PUSCH support in UpPTS", pp. 5.
Intel Corporation, Qualcomm, 3GPP TSG-RAN WG2 Meeting #96, R2-167755, Reno, USA, Nov. 14-18, 2016, Change Request, "Clarification on Rel-13 CCH-IM UE capability", pp. 18.
European Search Report dated Dec. 19, 2019 issued in counterpart application No. 18736256.1-1220, 11 pages.
European Search Report dated Oct. 5, 2020 issued in counterpart application No. 18736256.1-1220, 6 pages.
European Search Report dated Apr. 21, 2021 issued in counterpart application No. 18736256.1-1216, 5 pages.
Chinese Office Action dated Sep. 22, 2021 issued in counterpart application No. 201710910258.9, 27 pages.
European Search Report dated Oct. 21, 2021 issued in counterpart application No. 18736256.1-1216, 6 pages.
European Search Report dated May 2, 2022 issued in counterpart application No. 18736256.1-1206, 7 pages.
Lenovo, "HARQ-ACK Codebook Adaptation for Rel-13 eCA", R1-156729, 3GPP TSG RAN WG1 Meeting #82bis, Nov. 15-22, 2015, 4 pages.
CATT, "Explicit HARQ and Scheduling Timing Design for LTE sTTI", R1-1611360, 3GPP TSG RAN WG1 Meeting #87, Nov. 14-18, 2016, 3 pages.
Indian Examination Report dated Jan. 18, 2022 issued in counterpart application No. 201937030194, 8 pages.
European Search Report dated Oct. 18, 2022 issued in counterpart application No. 18736256.1-1206, 6 pages.
CATT, "Explicit HARQ and Scheduling Timing Design for LTE sTTI", R1-1610444, 3GPP TSG RAN WG1 Meeting #86bis, Oct. 10-14, 2016, 3 pages.
Korean Office Action dated Mar. 16, 2023 issued in counterpart application No. 10-2019-7023414, 15 pages.
European Search Report dated Mar. 22, 2023 issued in counterpart application No. 18736256.1-1206, 5 pages.
KR Notice of Patent Grant dated Jul. 26, 2023 issued in counterpart application No. 10-2019-7023414, 5 pages.
European Search Report dated Sep. 28, 2023 issued in counterpart application No. 18736256.1-1206, 7 pages.

* cited by examiner

[Fig. 14]
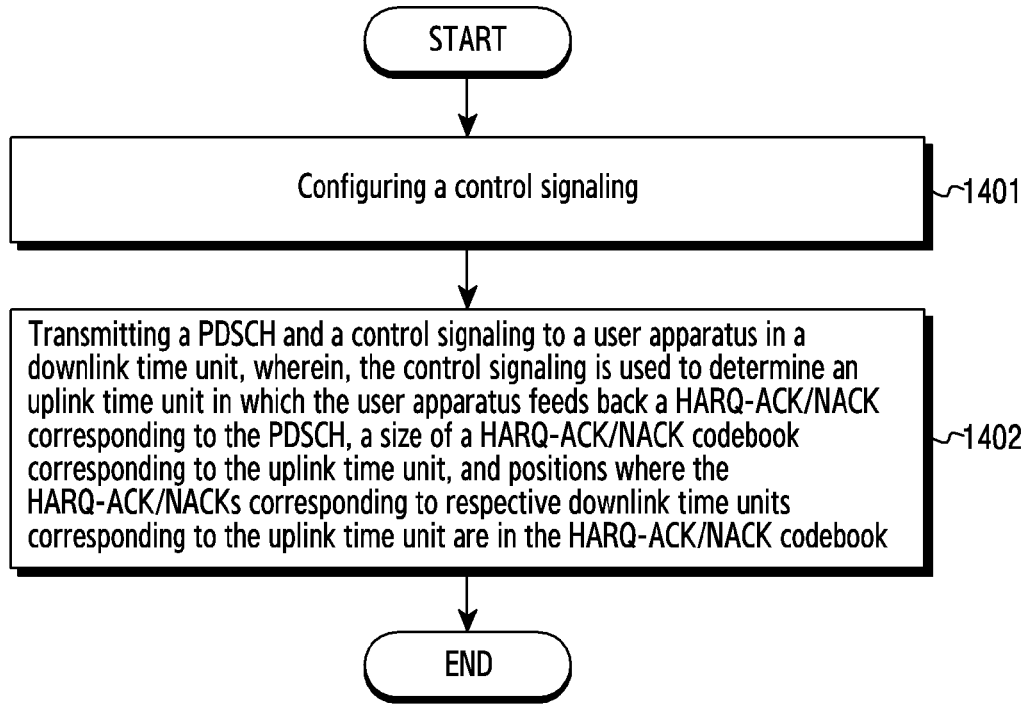
[Fig. 15]
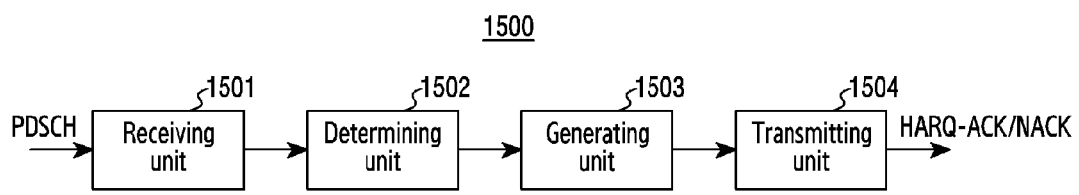
[Fig. 16]
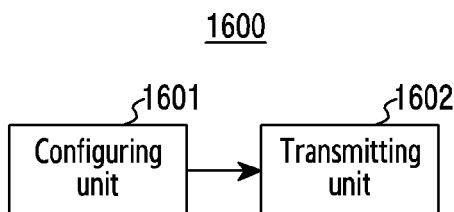

[Fig. 17]
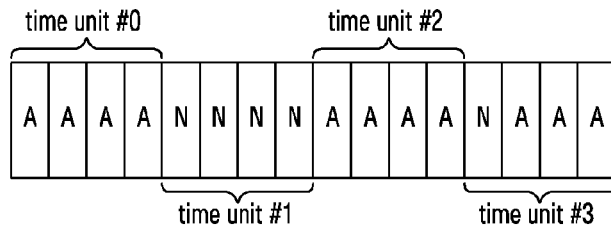
[Fig. 18]
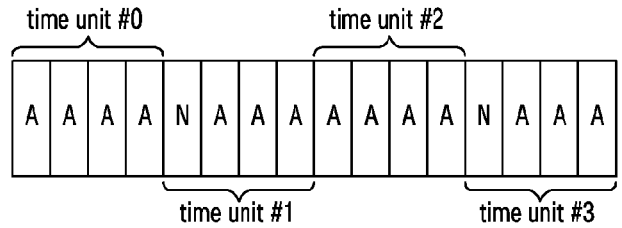

METHOD AND APPARATUS FOR TRANSMITTING HARQ-ACK/NACK IN WIRELESS COMMUNICATION SYSTEM

PRIORITY

This application is a National Phase Entry of PCT International Application No. PCT/KR2018/000282, which was filed on Jan. 5, 2018, and claims priority to Chinese Patent Application Nos. 201710013439.1, 201710035080.8, 201710812599.2, and 201710910258.9, which were filed on Jan. 9, 2017, Jan. 18, 2017, Sep. 11, 2017 and Sep. 29, 2017, respectively, the content of each of which are incorporated herein by reference.

TECHNICAL FIELD

The present disclosure relates to a technical field of a mobile communication, in specific, relates to a method and apparatus of transmitting a HARQ-ACK/NACK (Hybrid Automatic Repeat Request-Acknowledgment/Negative Acknowledgment) and a downlink transmission method and apparatus.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

The present disclosure is provided to at least solve the above problems, and at least provide the following advantages.

Solution to Problem

According to one aspect of the present disclosure, a method of transmitting a HARQ-ACK/NACK (Hybrid Automatic Repeat Request-Acknowledgment/Negative Acknowledgment) is provided, and the method includes: receiving, by a user equipment, a PDSCH (Physical Downlink Shared Channel) and a control signaling from a base station in downlink time unit(s); determining, by a user equipment, an uplink time unit in which the HARQ-ACK/NACK corresponding to the received PDSCH is fed back, a size of a HARQ-ACK/NACK codebook for the uplink time unit, and bit positions where the HARQ-ACK/NACKs corresponding to respective downlink time units corresponding to the same uplink time unit are in the HARQ-ACK/NACK codebook, based on the control signaling; generating the HARQ-ACK/NACK codebook, by a user equipment, based on the size of the HARQ-ACK/NACK codebook and the bit positions where the HARQ-ACK/NACKs corresponding to the respective downlink time units corresponding to the same uplink time unit are in the HARQ-ACK/NACK codebook; and transmitting, by a user equipment, the HARQ-ACK/NACK codebook in the uplink time unit.

The control signaling may be a downlink schedule signaling carried by a PDCCH (Physical Uplink Control Channel) or a control signaling carried by the PDSCH.

The control signaling may comprise HARQ-ACK/NACK timing.

HARQ-ACK/NACK timing may be one of: information indicating a time difference between the downlink time unit in which the PDSCH is received and the uplink time unit in which the HARQ-ACK/NACK is fed back, information indicating one or more uplink time units, in which the configured PUCCHs are included, which are greater than or equal to a least time difference between the downlink time unit in which the PDSCH is received and the uplink time unit in which the HARQ-ACK/NACK is fed back and which are closest to the least time difference, and information indicating whether it indicates a time difference between the downlink time unit in which a predefined PDSCH is and the uplink time unit in which the HARQ-ACK/NACK is fed back or one or more uplink time units in which the configured PUCCHs are included, which are greater than or equal to a least time difference between the downlink time unit in which the PDSCH is received and the uplink time unit in which the HARQ-ACK/NACK is fed back and which are closest to the least time difference.

The number of bits for HARQ-ACK/NACK timing is different for different downlink control information (DCIs). The number of bits for HARQ-ACK/NACK timing in the DCI within a common search of a downlink control channel is different from that in the DCI within a UE specific search space.

Time difference between the downlink time unit in which the PDSCH is received and the uplink time unit in which the HARQ-ACK/NACK is fed back is different for different DCIs. The time difference indicated by the DCI within the common search space of the downlink control channel is predefined by the specification, and the time difference indicated by the DCI within the UE specific search space is configured by higher-layer signaling.

The determining the size of the HARQ-ACK/NACK codebook for the uplink time unit may comprise one of:
  calculating a size of a feedback window based on HARQ-ACK/NACK timing, wherein the feedback window is a DL association set consisting of all downlink time units of which the HARQ-ACK/NACKs can be fed back in the same uplink time unit simultaneously based on the set of HARQ-ACK timings; and obtaining a size of the HARQ-ACK/NACK codebook for the uplink time unit by the size of the feedback window and a number of bits of the HARQ-ACK/NACK corresponding to each downlink time unit.

The control signaling may further comprise a first class DAI (Downlink Assignment Index) and/or a second class DAI, wherein the first class DAI indicates one of the following information: a relative time sequence of the currently scheduled downlink time unit in all the scheduled downlink time units corresponding to the same uplink time unit, and bit positions where the HARQ-ACK/NACK bits of the currently scheduled downlink time unit are in the HARQ-ACK/NACK codebook.

In the control signaling, the first class DAI and HARQ-ACK/NACK timing may be joint encoded.

Wherein the second class DAI indicates one of the following information: a total number of downlink time units of all the scheduled downlink time units corresponding to the same uplink time unit, a total number of downlink time units from a first downlink time unit up to the current downlink time unit among all the scheduled downlink time units corresponding to the same uplink time unit, and a total number of bits of the HARQ-ACK/NACK codebook.

The control signaling may comprise a third class DAI, wherein, the content indicated by the third class DAI is the same as the content indicated by the second class DAI, or the third class DAI indicates the total number of bits of the received HARQ-ACK/NACK codebook expected by the base station and the total number of bits of the HARQ-ACK/NACK corresponding to the PDSCH actually scheduled by the base station is equal to or smaller than the expected total number of bits.

In the control signaling, the first class DAI, the second class DAI and HARQ-ACK/NACK timing may be joint encoded.

The determining the size of the HARQ-ACK/NACK codebook for the uplink time unit may comprise one of:

determining a size of the HARQ-ACK/NACK codebook by a maximum value of the first class DAIs of all the scheduled downlink time units corresponding to the same uplink time unit and a number of bits of the HARQ-ACK/NACK corresponding to each downlink time unit; determining the size of the HARQ-ACK/NACK codebook by a value of the second class DAI and the number of bits of the HARQ-ACK/NACK corresponding to each downlink time unit in the case where the second class DAI indicates a total number of downlink time units of all the scheduled downlink time units corresponding to the same uplink time unit; determining the size of the HARQ-ACK/NACK codebook by a maximum value of the second class DAIs of all the scheduled downlink time units corresponding to the same uplink time unit and the number of bits of the HARQ-ACK/NACK corresponding to each downlink time unit in the case where the second class DAI indicates the total number of downlink time units from the first downlink time unit to the current downlink time unit among all the scheduled downlink time units corresponding to the same uplink time unit; and determining the size of the HARQ-ACK/NACK codebook based on the number of bits indicated by the second class DAI in the case where the second class DAI indicates the total number of bits of the HARQ-ACK/NACK codebook.

If the third class DAI is indicated, the HARQ-ACK/NACK codebook is determined commonly according to the first class DAI, the second class DAI and the third class DAI. Wherein, if the values of the second class DAI and the third class DAI are different, the size of the HARQ-ACK/NACK codebook is determined according to the third class DAI, and the bit order of HARQ-ACKs in the codebook is determined at least according to the first class DAI.

The number of bits of the HARQ-ACK/NACK corresponding to each downlink time unit may be predefined by the specification or semi-statically configured, and wherein the number of bits of the HARQ-ACK/NACK corresponding to each downlink time unit is determined according to one of: a configured maximum number of transmission blocks (TB) in each downlink time unit, a configured maximum number of coding blocks (CB)s in each downlink time unit, and a configured maximum number of coding block groups (CBG)s. Preferably, with respect to a specific carrier, when configuring the number of bits of the HARQ-ACK/NACK corresponding to each downlink time unit according to a configured maximum number of CBGs, the HARQ-ACK/NACK bits are determined according to the configured number of the CBGs, regardless of whether the PDSCH in the downlink time unit is scheduled by TB or CBG-based DCI.

The control signaling may further comprise information indicating that the number of bits of the HARQ-ACK/NACK corresponding to each downlink time unit is determined according to a configured maximum number of TB s in each downlink time unit, or according to a configured maximum number of CBs in each downlink time unit, or according to a configured maximum number of CBGs in each downlink time unit.

The control signaling may further comprise a size of the HARQ-ACK/NACK codebook is configured by the base station, and wherein the determining the size of the HARQ-ACK/NACK codebook for the uplink time unit comprises: determining the size of the HARQ-ACK/NACK codebook for the uplink time unit by base station configuration.

The determining the bit positions where the HARQ-ACK/NACKs corresponding to the respective downlink time units corresponding to the same uplink time unit are in the HARQ-ACK/NACK codebook may comprise: obtaining a minimum number of bits that can be occupied by the HARQ-ACK/NACK corresponding to each HARQ process by dividing the determined size of the HARQ-ACK/NACK codebook by a total number of HARQ processes which are supportable in one uplink time unit; and obtaining start points where the HARQ-ACK/NACKs corresponding to the respective downlink time units corresponding to the same uplink time unit are in the HARQ-ACK/NACK codebook by multiplying the minimum number of bits that can be occupied by the HARQ-ACK/NACK corresponding to each HARQ process by IDs of the HARQ processes of the respective downlink time units corresponding to the same uplink time unit.

The generating the HARQ-ACK/NACK codebook may comprise: generating a HARQ-ACK/NACK according to the received PDSCH with respect to a valid HARQ process, and inserting the HARQ-ACK/NACK generated with respect to the valid HARQ process into the HARQ-ACK/NACK codebook based on the start point where the HARQ-ACK/NACK corresponding to the downlink time unit corresponding to the valid HARQ process is in the HARQ-ACK/NACK codebook; and generating a HARQ-NACK according to a predefined rule with respect to an invalid HARQ process, and inserting the HARQ-NACK generated with respect to the invalid HARQ process into the HARQ-ACK/NACK codebook based on the start point where the HARQ-ACK/NACK corresponding to the downlink time unit corresponding to the invalid HARQ process is in the HARQ-ACK/NACK codebook.

The valid HARQ process may indicate a HARQ process in which a PDSCH is received in a downlink time unit corresponding to the uplink time unit and a HARQ-ACK/NACK of the PDSCH is fed back in the uplink time unit, and the invalid HARQ process may indicate a HARQ process in which a PDSCH is not received in a downlink time unit corresponding to the uplink time unit, and/or a HARQ process in which a PDSCH is received in a downlink time unit corresponding to the uplink time unit but a HARQ-ACK/NACK of the PDSCH is not fed back in the uplink time unit; or the valid HARQ process may indicate a HARQ process in which the PDSCH is received in a downlink time unit corresponding to the uplink time unit and a time difference between the downlink time unit in which the PDSCH is received and the uplink time unit is greater than or equal to a predefined least delay, and the invalid HARQ process may indicate a HARQ process in which the PDSCH is not received in a downlink time unit corresponding to the uplink time unit, and/or a HARQ process in which the PDSCH is received in a downlink time unit corresponding to the uplink time unit but the time difference between the downlink time unit in which the PDSCH is received and the uplink time unit is smaller than the predefined least delay, and/or a HARQ process in which the PDSCH is received in a downlink time unit corresponding to the uplink time unit but a HARQ-ACK/NACK of the PDSCH has been fed back before the uplink time unit.

The inserting the HARQ-ACK/NACK generated with respect to the valid HARQ process into the HARQ-ACK/NACK codebook comprises: when a number of bits of the HARQ-ACK/NACK corresponding to the valid HARQ process is greater than the minimum number of bits that can be occupied by the HARQ-ACK/NACK corresponding to each HARQ process, enabling the HARQ-ACK/NACK corresponding to the valid HARQ process to occupy a bit position of the HARQ-ACK/NACK corresponding to the next HARQ process, and wherein the inserting the HARQ-NACK generated with respect to the invalid HARQ process into the HARQ-ACK/NACK codebook comprises: when a bit position of the HARQ-ACK/NACK corresponding to the invalid HARQ process is occupied by the HARQ-ACK/NACK corresponding to the valid HARQ process, determining the number of bits of the HARQ-ACK/NACK corresponding to the invalid HARQ process as a difference between the minimum number of bits that can be occupied by the HARQ-ACK/NACK corresponding to each HARQ process and a number of bits occupied by the HARQ-ACK/NACK corresponding to the valid HARQ process.

The determining the bit positions where the HARQ-ACK/NACKs corresponding to the respective downlink time units corresponding to the same uplink time unit are in the HARQ-ACK/NACK codebook may comprise one of:

calculating downlink time unit indexes of the respective downlink time units corresponding to the same uplink time units based on configured HARQ-ACK/NACK timing, wherein the downlink time unit indexes of the respective downlink time units corresponding to the same uplink time units represents the order of the respective downlink time units corresponding to the same uplink time units in the feedback window, respectively;

obtaining a minimum number of bits that can be occupied by the HARQ-ACK/NACK corresponding to each downlink time unit by dividing the size of the HARQ-ACK/NACK codebook by the size of the feedback window; and obtaining starting points where the HARQ-ACK/NACKs corresponding to the respective downlink time units corresponding to the same uplink time unit are in the HARQ-ACK/NACK codebook by multiplying the minimum number of bits that can be occupied by the HARQ-ACK/NACK corresponding to each downlink time unit by the downlink time unit indexes of the respective downlink time units corresponding to the same uplink time unit.

The determining the bit positions where the HARQ-ACK/NACKs corresponding to the respective downlink time units corresponding to the same uplink time unit are in the HARQ-ACK/NACK codebook may comprise one of:

calculating a size of a feedback window based on HARQ-ACK/NACK timing, wherein the feedback window is a DL association set consisting of all downlink time units of which the HARQ-ACK/NACKs can be fed back in the same uplink time unit simultaneously based on the set of HARQ-ACK timings;

and determining downlink time unit indexes of the respective downlink time units corresponding to the same uplink time unit based on configured HARQ-ACK/NACK timing, wherein the downlink time unit indexes of the respective downlink time units corresponding to the same uplink time unit represents the order of the respective downlink time units corresponding to the same uplink time unit in the feedback window, respectively;

obtaining a minimum number of bits that can be occupied by the HARQ-ACK/NACK corresponding to each downlink time unit; and obtaining starting points where the HARQ-ACK/NACKs corresponding to the respective downlink time units corresponding to the same uplink time unit are in the HARQ-ACK/NACK codebook by multiplying the minimum number of bits that can be occupied by the HARQ-ACK/NACK corresponding to each downlink time unit by the downlink time unit indexes of the respective downlink time units corresponding to the same uplink time unit.

The control signaling may further comprise information indicating that a time unit in which a PDSCH is not allowed to transmit, wherein the calculating the size of the feedback window comprises: calculating a size of the feedback window by subtracting a number of the time units in which the PDSCH is not allowed to transmit from the calculated size of the feedback window, or if the information indicating that the time unit in which the PDSCH is not allowed to transmit is indicated through a dynamic signaling, the size of the feedback window is not changed by the indicated time unit in which the PDSCH is not allowed to transmit; if the information indicating that the time unit in which the PDSCH is not allowed to transmit is indicated through a semi-static signaling, calculating a size of the feedback window by subtracting the number of the time units in which the PDSCH is not allowed to transmit from the calculated size of the feedback window.

The generating the HARQ-ACK/NACK codebook may comprise: generating a HARQ-ACK/NACK according to the received PDSCH with respect to a valid downlink time unit, and inserting the HARQ-ACK/NACK generated with respect to the valid downlink time unit into the HARQ-ACK/NACK codebook based on the start point where the HARQ-ACK/NACK corresponding to the valid downlink time unit is in the HARQ-ACK/NACK codebook; and generating a HARQ-NACK according to a predefined rule with respect to an invalid downlink time unit, and inserting the HARQ-NACK generated with respect to the invalid downlink time unit into the HARQ-ACK/NACK codebook based on the start point where the HARQ-ACK/NACK corresponding to the invalid downlink time unit is in the HARQ-ACK/NACK codebook, or, generating a HARQ-NACK according to the predefined rule with respect to a downlink time unit in which a PDSCH is not received, and inserting the generated HARQ-NACK into the HARQ-ACK/NACK codebook based on the bit position where the HARQ-ACK/NACK corresponding to the downlink time unit in which the PDSCH is not received is in the HARQ-ACK/NACK codebook; and with respect to a downlink time unit in which a PDSCH is received but an uplink time unit in which a HARQ-ACK/NACK corresponding to the PDSCH is not the uplink time unit, generating a HARQ-ACK/NACK according to the PDSCH, and inserting the generated HARQ-ACK/NACK into the HARQ-ACK/NACK codebook.

The valid downlink time unit may indicate a downlink time unit in which a PDSCH is received and an uplink time unit in which a HARQ-ACK/NACK corresponding to the PDSCH is the uplink time unit, and the invalid downlink time unit may indicate a downlink time unit in which a PDSCH is not received, or a downlink time unit in which a PDSCH is received and an uplink time unit in which a HARQ-ACK/NACK corresponding to the PDSCH is not the uplink time unit.

The inserting the HARQ-ACK/NACK generated with respect to the valid downlink time unit into the HARQ-ACK/NACK codebook may comprise: when a number of bits of the HARQ-ACK/NACK corresponding to the valid downlink time unit is greater than the minimum number of bits that can be occupied by the HARQ-ACK/NACK corresponding to each downlink time unit, enabling the HARQ-ACK/NACK corresponding to the valid downlink time unit to occupy a bit position of the HARQ-ACK/NACK corresponding to the next downlink time unit, and wherein the inserting the HARQ-NACK generated with respect to the invalid downlink time unit into the HARQ-ACK/NACK codebook comprises: when a bit position of the HARQ-ACK/NACK corresponding to the invalid downlink time unit is occupied by the HARQ-ACK/NACK corresponding to the valid downlink time unit, determining a number of bits of the HARQ-ACK/NACK corresponding to the invalid downlink time unit as a difference between the minimum number of bits that can be occupied by the HARQ-ACK/NACK corresponding to each downlink time unit and a number of bits occupied by the HARQ-ACK/NACK corresponding to the valid downlink time unit.

The determining the bit positions where the HARQ-ACK/NACKs corresponding to the respective downlink time units corresponding to the same uplink time unit are in the HARQ-ACK/NACK codebook may comprise one of: determining the bit positions where HARQ-ACK/NACKs corresponding to the respective downlink time units of all the scheduled downlink time units corresponding to the same uplink time unit are in the HARQ-ACK/NACK codebook, based on values of the first class DAIs of all the scheduled downlink time units corresponding to the same uplink time units.

The generating the HARQ-ACK/NACK codebook may comprise: inserting the HARQ-ACK/NACKs corresponding to all the scheduled downlink time units in sequence from an initial bit position of the HARQ-ACK/NACK codebook, according to the order indicated by the first class DAIs of all the scheduled downlink time units corresponding to the same uplink time unit, and inserting occupied bits at the following bit positions.

The transmitting the HARQ-ACK/NACK codebook may comprise: when a total number of bits of uplink control signaling including at least the HARQ-ACK/NACKs which need to be fed back in the same uplink time unit exceeds a maximum number of bits of uplink control signaling that can be carried by a given PUCCH resource configured by the base station, performing one of the following operations: compressing bits of the HARQ-ACK/NACKs which needs to be fed back in the uplink time unit according to a predefined rule; transmitting the uplink control signaling in the uplink time unit by using next greater PUCCH resource that can carry the total number of bits of the uplink control signaling which need to be fed back; receiving downlink schedule information indicating a new PUCCH resource that can carry the total number of bits of the uplink control signaling which need to be fed back, in the current downlink time unit or at least the last downlink time unit corresponding to the uplink time unit, and transmitting the uplink control signaling in the uplink time unit by using the new PUCCH resource; and abandoning to transmit the HARQ-ACK/NACK of the downlink time unit having a low priority, so that the total number of bits of the transmitted uplink control signaling does not exceed the maximum number of bits of the uplink control signaling that can be carried by the PUCCH resource configured by the base station.

According to another aspect of this disclosure, a downlink transmission method is provided, and the method comprising: configuring, by a base station, a control signaling; and transmitting, by a base station, a PDSCH (Physical Downlink Shared Channel) and a control signaling to a user equipment in a downlink time unit, wherein the control signaling is used to determine that the user equipment feeds back at least one of the following: an uplink time unit of a HARQ-ACK/NACK (Hybrid Automatic Repeat Request-Acknowledgment/Negative Acknowledgment) corresponding to the PDSCH, a size of a HARQ-ACK/NACK codebook for the uplink time unit, and bit positions where the HARQ-ACK/NACKs corresponding to respective downlink time units corresponding to the same uplink time unit are in the HARQ-ACK/NACK codebook.

According to another aspect of this disclosure, an apparatus of transmitting a HARQ-ACK/NACK (Hybrid Automatic Repeat Request-Acknowledgment/Negative Acknowledgment) is provided, the apparatus comprising: a receiving unit receiving a PDSCH (Physical Downlink Shared Channel) and a control signaling from a base station in downlink time unit(s); a determining unit determining an uplink time unit in which the HARQ-ACK/NACK corresponding to the received PDSCH is fed back, a size of a HARQ-ACK/NACK codebook for the uplink time unit, and bit positions where the HARQ-ACK/NACKs corresponding to respective downlink time units corresponding to the same uplink time unit are in the HARQ-ACK/NACK codebook, based on the control signaling; a generating unit, generating the HARQ-ACK/NACK codebook, based on the size of the HARQ-ACK/NACK codebook and the bit positions where the HARQ-ACK/NACKs corresponding to the respective downlink time units corresponding to the same uplink time unit are in the HARQ-ACK/NACK codebook; and a transmitting unit transmitting the HARQ-ACK/NACK codebook in the uplink time unit.

The control signaling may be a downlink schedule signaling carried by a PDCCH (Physical Uplink Control Channel) or a control signaling carried by the PDSCH.

The control signaling may comprise HARQ-ACK/NACK timing.

HARQ-ACK/NACK timing may be one of: information indicating a time difference between the downlink time unit in which the PDSCH is received and the uplink time unit in which the HARQ-ACK/NACK is fed back, information indicating one or more uplink time units, in which the configured PUCCHs are included, which are greater than or equal to a least time difference between the downlink time unit in which the PDSCH is received and the uplink time unit in which the HARQ-ACK/NACK is fed back and which are closest to the least time difference, and information indicating whether it indicates a time difference between the downlink time unit in which a predefined PDSCH is and the uplink time unit in which the HARQ-ACK/NACK is fed back or one or more uplink time units in which the configured PUCCHs are included, which are greater than or equal to a least time difference between the downlink time unit in which the PDSCH is received and the uplink time unit in which the HARQ-ACK/NACK is fed back and which are closest to the least time difference.

The control signaling may further comprise a first class DAI, wherein the first class DAI indicates one of the following information: a relative time sequence of the currently scheduled downlink time unit in all the scheduled downlink time units corresponding to the same uplink time unit, and bit positions where the HARQ-ACK/NACK bits of the currently scheduled downlink time unit are in the HARQ-ACK/NACK codebook.

In the control signaling, the first class DAI and the HARQ-ACK/NACK timing may be joint encoded.

The control signaling may further comprise a second class DAI, wherein the second class DAI indicates one of the following information: a total number of downlink time units of all the scheduled downlink time units corresponding to the same uplink time unit, a total number of downlink time units from a first downlink time unit to the current downlink time unit among all the scheduled downlink time units corresponding to the same uplink time unit, and a total number of bits of the HARQ-ACK/NACK codebook.

In the control signaling, the first class DAI, the second class DAI and the HARQ-ACK/NACK timing may be joint encoded.

The determining unit may calculate a size of a feedback window based on the HARQ-ACK/NACK timing, wherein the feedback window is DL association set consisting of all downlink time units of which the HARQ-ACK/NACKs can be fed back in the same uplink time unit simultaneously based on the set of HARQ-ACK timings; and obtain a size of the HARQ-ACK/NACK codebook for the uplink time unit by the size of the feedback window and a number of bits of the HARQ-ACK/NACK corresponding to each downlink time unit.

The determining unit may perform one of the following operations: determining a size of the HARQ-ACK/NACK codebook by a maximum value of the first class DAIs of all the scheduled downlink time units corresponding to the same uplink time unit and a number of bits of the HARQ-ACK/NACK corresponding to each downlink time unit; determining the size of the HARQ-ACK/NACK codebook by a value of the second class DAI and the number of bits of the HARQ-ACK/NACK corresponding to each downlink time unit in the case where the second class DAI indicates a total number of downlink time units of all the scheduled downlink time units corresponding to the same uplink time unit; determining the size of the HARQ-ACK/NACK codebook by a maximum value of the second class DAIs of all the scheduled downlink time units corresponding to the same uplink time unit and the number of bits of the HARQ-ACK/NACK corresponding to each downlink time unit in the case where the second class DAI indicates the total number of downlink time units from the first downlink time unit to the current downlink time unit among all the scheduled downlink time units corresponding to the same uplink time unit; and determining the size of the HARQ-ACK/NACK codebook based on the number of bits indicated by the second class DAI in the case where the second class DAI indicates the total number of bits of the HARQ-ACK/NACK codebook.

The number of bits of the HARQ-ACK/NACK corresponding to each downlink time unit may be predefined by the specification or semi-statically configured, and wherein the number of bits of the HARQ-ACK/NACK corresponding to each downlink time unit is determined according to one of: a configured maximum number of TBs in each downlink time unit, a configured maximum number of coding blocks (CB)s in each downlink time unit, and a configured maximum number of CBGs in each downlink time unit.

The control signaling may further comprise information indicating that the number of bits of the HARQ-ACK/NACK corresponding to each downlink time unit is determined according to a configured maximum number of TBs in each downlink time unit, or according to a configured maximum number of CBs in each downlink time unit, or according to a configured maximum number of CBGs in each downlink time unit.

The control signaling may further comprise a size of the HARQ-ACK/NACK codebook configured by the base station, and the determining unit may determine the size of the HARQ-ACK/NACK codebook for the uplink time unit based on the size of HARQ-ACK/NACK codebook configured by the base station.

the determining unit may obtain a minimum number of bits that can be occupied by the HARQ-ACK/NACK corresponding to each HARQ process by dividing the determined size of the HARQ-ACK/NACK codebook by a total number of HARQ processes which are supportable in one uplink time unit; and obtain start points where the HARQ-ACK/NACKs corresponding to the respective downlink time units corresponding to the same uplink time unit are in the HARQ-ACK/NACK codebook by multiplying the minimum number of bits that can be occupied by the HARQ-ACK/NACK corresponding to each HARQ process by IDs of the HARQ processes of the respective downlink time units corresponding to the same uplink time unit.

The generating unit may generate a HARQ-ACK/NACK according to the received PDSCH with respect to a valid HARQ process, and insert the HARQ-ACK/NACK generated with respect to the valid HARQ process into the HARQ-ACK/NACK codebook based on the start point where the HARQ-ACK/NACK corresponding to the downlink time unit corresponding to the valid HARQ process is in the HARQ-ACK/NACK codebook; and generate a HARQ-NACK according to a predefined rule with respect to an invalid HARQ process, and insert the HARQ-NACK generated with respect to the invalid HARQ process into the HARQ-ACK/NACK codebook based on the start point where the HARQ-ACK/NACK corresponding to the downlink time unit corresponding to the invalid HARQ process is in the HARQ-ACK/NACK codebook.

The valid HARQ process may indicate a HARQ process in which a PDSCH is received in a downlink time unit corresponding to the uplink time unit and a HARQ-ACK/NACK of the PDSCH is fed back in the uplink time unit, and the invalid HARQ process may indicate a HARQ process in which a PDSCH is not received in a downlink time unit corresponding to the uplink time unit, and/or a HARQ process in which a PDSCH is received in a downlink time unit corresponding to the uplink time unit but a HARQ-ACK/NACK of the PDSCH is not fed back in the uplink time unit; or the valid HARQ process may indicate a HARQ process in which the PDSCH is received in a downlink time unit corresponding to the uplink time unit and a time difference between the downlink time unit in which the PDSCH is received and the uplink time unit is greater than or equal to a predefined least delay, and the invalid HARQ process may indicate a HARQ process in which the PDSCH is not received in a downlink time unit corresponding to the uplink time unit, and/or a HARQ process in which the PDSCH is received in a downlink time unit corresponding to the uplink time unit but the time difference between the downlink time unit in which the PDSCH is received and the uplink time unit is smaller than the predefined least delay, and/or a HARQ process in which the PDSCH is received in a downlink time unit corresponding to the uplink time unit but a HARQ-ACK/NACK of the PDSCH has been fed back before the uplink time unit.

when a number of bits of the HARQ-ACK/NACK corresponding to the valid HARQ process is greater than the minimum number of bits that can be occupied by the HARQ-ACK/NACK corresponding to each HARQ process, the generate unit may enable the HARQ-ACK/NACK corresponding to the valid HARQ process to occupy a bit position of the HARQ-ACK/NACK corresponding to the next HARQ process, and wherein the inserting the HARQ-NACK generated with respect to the invalid HARQ process into the HARQ-ACK/NACK codebook comprises: when a bit position of the HARQ-ACK/NACK corresponding to the invalid HARQ process is occupied by the HARQ-ACK/NACK corresponding to the valid HARQ process, determining the number of bits of the HARQ-ACK/NACK corresponding to the invalid HARQ process as a difference between the minimum number of bits that can be occupied by the HARQ-ACK/NACK corresponding to each HARQ process and a number of bits occupied by the HARQ-ACK/NACK corresponding to the valid HARQ process.

The determining unit may calculate downlink time unit indexes of the respective downlink time units corresponding to the same uplink time unit based on the HARQ-ACK/NACK timing, wherein the downlink time unit indexes of the respective downlink time units corresponding to the same uplink time unit represent the order of the respective downlink time units corresponding to the same uplink time unit in the feedback window, respectively.

The determining unit may obtain a minimum number of bits that can be occupied by the HARQ-ACK/NACK corresponding to each downlink time unit by dividing the size of the HARQ-ACK/NACK codebook by the size of the feedback window; and obtaining start points where the HARQ-ACK/NACKs corresponding to the respective downlink time units corresponding to the same uplink time unit are in the HARQ-ACK/NACK codebook by multiplying the minimum number of bits that can be occupied by the HARQ-ACK/NACK corresponding to each downlink time unit by the downlink time unit indexes of the respective downlink time units corresponding to the same uplink time unit.

The determining unit may calculate a size of a feedback window based on the HARQ-ACK/NACK timing, wherein the feedback window is a set of all downlink time units of which the HARQ-ACK/NACKs are fed back in the same uplink time unit simultaneously and which are determined by all possible values of the HARQ-ACK/NACK timing; and determine downlink time unit indexes of the respective downlink time units corresponding to the same uplink time unit based on the HARQ-ACK/NACK timing, wherein the downlink time unit indexes of the respective downlink time units corresponding to the same uplink time unit represent the order of the respective downlink time units corresponding to the same uplink time unit in the feedback window, respectively.

The determining unit may obtain a minimum number of bits that can be occupied by the HARQ-ACK/NACK corresponding to each downlink time unit by dividing the size of the HARQ-ACK/NACK codebook by the size of the feedback window; and obtain start points where the HARQ-ACK/NACKs corresponding to the respective downlink time units corresponding to the same uplink time unit are in the HARQ-ACK/NACK codebook by multiplying the minimum number of bits that can be occupied by the HARQ-ACK/NACK corresponding to each downlink time unit by the downlink time unit indexes of the respective downlink time units corresponding to the same uplink time unit.

The control signaling may further comprise information indicating that a time unit in which a PDSCH is not allowed to transmit, wherein the calculating the size of the feedback window comprises: calculating a size of the feedback window by subtracting a number of the time units in which the PDSCH is not allowed to transmit from the calculated size of the feedback window, or if the information indicating that the time unit in which the PDSCH is not allowed to transmit is indicated through a dynamic signaling, maintaining the calculated size of the feedback window; if the information indicating that the time unit in which the PDSCH is not allowed to transmit is indicated through a semi-static signaling, calculating a size of the feedback window by subtracting the number of the time units in which the PDSCH is not allowed to transmit from the calculated size of the feedback window.

The generating unit may generate a HARQ-ACK/NACK according to the received PDSCH with respect to a valid downlink time unit, and insert the HARQ-ACK/NACK generated with respect to the valid downlink time unit into the HARQ-ACK/NACK codebook based on the start point where the HARQ-ACK/NACK corresponding to the valid downlink time unit is in the HARQ-ACK/NACK codebook; and generate a HARQ-NACK according to a predefined rule with respect to an invalid downlink time unit, and insert the HARQ-NACK generated with respect to the invalid downlink time unit into the HARQ-ACK/NACK codebook based on the start point where the HARQ-ACK/NACK corresponding to the invalid downlink time unit is in the HARQ-ACK/NACK codebook, or, may generate a HARQ-NACK according to the predefined rule with respect to a downlink time unit in which a PDSCH is not received, and insert the generated HARQ-NACK into the HARQ-ACK/NACK codebook based on the bit position where the HARQ-ACK/NACK corresponding to the downlink time unit in which the PDSCH is not received is in the HARQ-ACK/NACK codebook; and with respect to a downlink time unit in which a PDSCH is received but an uplink time unit in which a HARQ-ACK/NACK corresponding to the PDSCH is not the uplink time unit, generate a HARQ-ACK/NACK according to the PDSCH, and insert the generated HARQ-ACK/NACK into the HARQ-ACK/NACK codebook.

The valid downlink time unit may indicate a downlink time unit in which a PDSCH is received and an uplink time unit in which a HARQ-ACK/NACK corresponding to the PDSCH is the uplink time unit, and the invalid downlink time unit may indicate a downlink time unit in which a PDSCH is not received, or a downlink time unit in which a PDSCH is received and an uplink time unit in which a HARQ-ACK/NACK corresponding to the PDSCH is not the uplink time unit.

When a number of bits of the HARQ-ACK/NACK corresponding to the valid downlink time unit is greater than the minimum number of bits that can be occupied by the HARQ-ACK/NACK corresponding to each downlink time unit, the generating unit enables the HARQ-ACK/NACK corresponding to the valid downlink time unit to occupy a bit position of the HARQ-ACK/NACK corresponding to the next downlink time unit, and when a bit position of the HARQ-ACK/NACK corresponding to the invalid downlink time unit is occupied by the HARQ-ACK/NACK corresponding to the valid downlink time unit, determine a number of bits of the HARQ-ACK/NACK corresponding to the invalid downlink time unit as a difference between the minimum number of bits that can be occupied by the HARQ-ACK/NACK corresponding to each downlink time unit and a number of bits occupied by the HARQ-ACK/NACK corresponding to the valid downlink time unit.

The determining unit may determine the bit positions where HARQ-ACK/NACKs corresponding to the respective downlink time units of all the scheduled downlink time units corresponding to the same uplink time unit are in the HARQ-ACK/NACK codebook, based on values of the first class DAIs of all the scheduled downlink time units corresponding to the same uplink time unit.

The generating unit may insert the HARQ-ACK/NACKs corresponding to all the scheduled downlink time units in sequence from an initial bit position of the HARQ-ACK/NACK codebook, according to the order indicated by the first class DAIs of all the scheduled downlink time units corresponding to the same uplink time unit, and inserting occupied bits at the following bit positions.

In generating the HARQ-ACK/NACK codebook, if there is a same TB corresponding to at least two PDSCHs in one same HARQ-ACK/NACK codebook, the user terminal generates, with respect to the same TB, HARQ-ACK/NACK bits using HARQ-ACK/NACK of a last received PDSCH according to a decoding result of the PDSCH and sets HARQ-ACK/NACK bit values of all groups of coding blocks of the preceding PDSCH (or PDSCHs) to be a predefined value when the user terminal generates HARQ-ACK/NACKs of the PDSCHs; or with respect to the same TB, the user terminal sets the HARQ-ACK/NACK values of all the received PDSCHs to be a same value which is generated according to a demodulation result of a PDSCH received last time.

When a total number of bits of uplink control signaling including at least the HARQ-ACK/NACKs which need to be fed back in the uplink time unit exceeds a maximum number of bits of uplink control signaling that can be carried by PUCCH resources configured by the base station, the transmitting unit may perform one of the following operations: compressing bits of the HARQ-ACK/NACKs which needs to be fed back in the uplink time unit according to a predefined rule; transmitting the uplink control signaling in the uplink time unit by using next greater PUCCH resource that can carry the total number of bits of the uplink control signaling which need to be fed back; receiving downlink schedule information indicating a new PUCCH resource that can carry the total number of bits of the uplink control signaling which need to be fed back, in the current downlink time unit or at least the last downlink time unit corresponding to the uplink time unit, and transmitting the uplink control signaling in the uplink time unit by using the new PUCCH resource; and abandoning to transmit the HARQ-ACK/NACK of the downlink time unit having a low priority, so that the total number of bits of the transmitted uplink control signaling does not exceed the maximum number of bits of the uplink control signaling that can be carried by the PUCCH resources configured by the base station.

According to another aspect of this disclosure, a downlink transmission apparatus is provided, the apparatus comprising: a configuring unit configuring a control signaling; and a transmitting unit transmitting a PDSCH (Physical Downlink Shared Channel) and a control signaling to a user equipment in a downlink time unit, wherein the control signaling is used to determine that the user equipment feeds back at least one of the following: an uplink time unit of a HARQ-ACK/NACK (Hybrid Automatic Repeat Request-Acknowledgment/Negative Acknowledgment) corresponding to the PDSCH, a size of a HARQ-ACK/NACK codebook for the uplink time unit, and bit positions where the HARQ-ACK/NACKs corresponding to respective downlink time units corresponding to the same uplink time unit are in the HARQ-ACK/NACK codebook.

Advantageous Effects of Invention

According to the present disclosure, in the case where the HARQ-ACK feedback time is variable, the user equipment may figure out a size and bit mapping of the HARQ-ACK/NACK codebook exactly, and meanwhile, effective utilization of the uplink control channel resource is ensured.

BRIEF DESCRIPTION OF DRAWINGS

These and/or other aspects and advantages of the present disclosure will become apparent and more readily appreciated from the following description of the embodiments, taken in conjunction with the accompanying drawings in which:

FIG. 14 is a flowchart of a downlink transmission method according to the present disclosure;

FIG. 15 is a block diagram of an apparatus of transmitting a HARQ-ACK/NACK (Hybrid Automatic Repeat Request-Acknowledgment/Negative Acknowledgment) according to the present disclosure;

FIG. 16 is a block diagram of a downlink transmission apparatus according to the present disclosure;

FIG. 17 is a schematic diagram of uplink and downlink mapping based on the downlink time unit according to the third embodiment of the present disclosure; and FIG. 18 is another schematic diagram of uplink and downlink mapping based on the downlink time unit according to the third embodiment of the present disclosure.

BEST MODE FOR CARRYING OUT THE INVENTION

Figure 1:
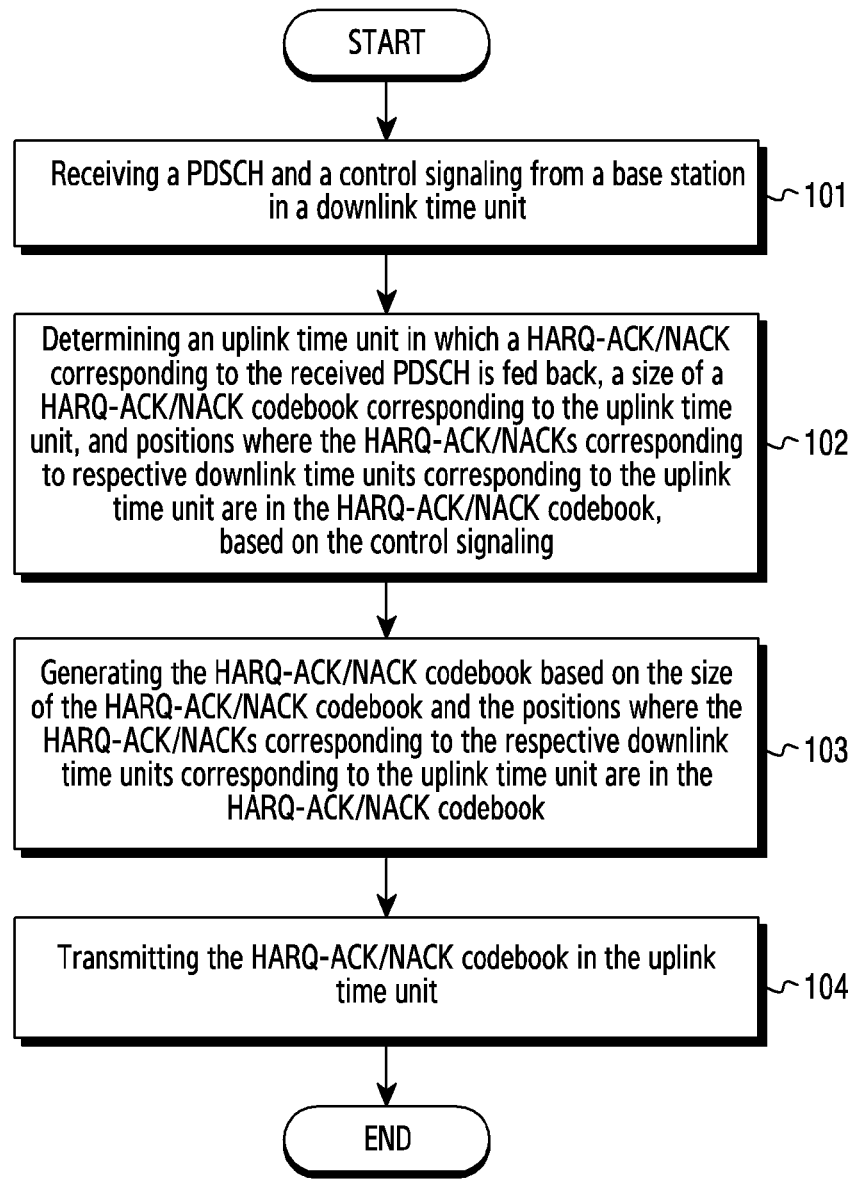
FIG. 1 is a flowchart of a method of transmitting a HARQ-ACK/NACK (Hybrid Automatic Repeat Request-Acknowledgment/Negative Acknowledgment) according to the present disclosure.

The following description is provided by referring to the drawings to help comprehensively understand the embodiments of the present disclosure defined by the claims and other equivalents thereof. Various special details are included to help understanding, and these details are only regarded as exemplary. Therefore, it will be understood by those of ordinary skilled in the art that various changes and amendments may be made to the embodiments described herein without departing from the spirit and scope of the present disclosure. In addition, for clearness and conciseness, the description to the known functions and structures may be omitted.

With the rapid development of the information industry, particularly the increasing requirements from the mobile Internet and internet of things (IoT) bring an unprecedented challenge for the future mobile communication technology. For example, according to the report of the International Telecommunications Union (ITU-R M. [IMT. BEYOND 2020. TRAFFIC]), it can be predicted that, the mobile service will increase about a thousand times by 2020 relative to that in 2010 (the 4th Generation), a connection number of user equipments will also exceed seventeen billion, and as a large number of IoT apparatuses permeate the mobile communication network gradually, the number of connection apparatuses will be more surprising. In order to meet the unprecedented challenge, the communication industry and academe have deployed a wide research on the 5th Generation mobile communication technology (5G) to face 2020. At present, the frame and overall goal of the future 5G have been discussed in the report of ITU (ITU-R M. [IMT. VISION]), wherein requirement prospects, application scenes and various important performance indicators for the 5G are explained specifically. With respect to the new requirement in the 5G, the report of ITU (ITU-R M. [IMT. FUTURE TECHNOLOGY TRENDS]) provides information about technology trend with respect to the 5G, which aims at solving prominent problems such as significant increasing of system throughput, consistency of user experience, expansibility to support IoT, time delay, energy efficiency, cost, network flexibility, emerging service support and flexible spectrum utilization, etc. In 3GPP (the 3rd Generation Partnership Project), the work in the first stage for the 5G is already underway. In order to support more flexible schedule, the 3GPP decides to support a variable HARQ-ACK feedback delay in the 5G. In the existing LTE (Long Term Evolution) system, the time from the receiving of downlink data to the uplink transmitting of the HARQ-ACK is fixed, for example, in a FDD (Frequency Division Duplexing) system, a time delay is four sub-frames; in a TDD (Time Division Duplexing) system, according to uplink and downlink configurations, a HARQ-ACK feedback time delay is determined for a corresponding downlink sub-frame. In a 5G system, whatever the FDD system or the TDD system, for one determined downlink time unit (for example, downlink time slot, or downlink mini time slot), an uplink time unit in which the HARQ-ACK may be fed back is variable. For example, an HARQ-ACK feedback time delay can be indicated by a physical layer signaling dynamically, and also different HARQ-ACK time delay can be determined according to different services, or factors such as user's ability and so on.

In the 5G, when the HARQ-ACK time delay can be varied, even if in the FDD system, the HARQ-ACK which needs to be fed back in one uplink time unit may be from downlink data of a plurality of downlink time units, and the number of the downlink time units of the HARQ-ACK which needs to be fed back is also variable, and generally, situations of each UE (Unified Equipment) are also different. With respect to the existing TDD system, since the HARQ-ACK time delay can be varied, an initial position of a bundling window of the HARQ-ACK feedback is variable, and a length thereof is also variable. Moreover, in the 5G, except for the HARQ-ACK feedback mechanism in a granularity of a TB in the existing LTE system, a HARQ-ACK feedback based on a CB can also be adopted, and thus, a total overhead of the HARQ-ACK will be increased. In order to realize schedule flexibility, and validity of the HARQ-ACK feedback, and a balance of downlink control signaling overhead of supporting the HARQ-ACK, a new method of transmitting and receiving the HARQ-ACK feedback is urgently needed.

FIG. 1 is a flowchart of a method of transmitting a HARQ-ACK/NACK according to the present disclosure. Below, a method of transmitting a HARQ-ACK/NACK by a user equipment according to an exemplary embodiment of the present disclosure will be illustrated with reference to FIG. 1.

First, at step 101, a user equipment receives a PDSCH (Physical Downlink Shared Channel) and a control signaling from a base station in downlink time unit(s).

Here, the control signaling is a downlink schedule signaling carried by a PDCCH (Physical Downlink Control Channel) or a control signaling carried by the PDSCH. The control signaling may include HARQ-ACK/NACK timing.

According to an exemplary embodiment, HARQ-ACK/NACK timing may be indicated by a dynamic signaling or a semi-static signaling. For example, HARQ-ACK/NACK timing may be indicated by downlink control information (DCI) carried by the PDCCH, or may be indicated by a higher-layer signaling carried by the PDSCH, or may be indicated by a combination of the above two.

According to the exemplary embodiment, a number of bits for HARQ-ACK/NACK timing may be predefined by specification or semi-static configured by a base station. For example, the specification predefines 2 bits for HARQ-ACK/NACK timing, or, the higher-layer signaling configures a set of time difference from the feedback of ACK/NACK to the receiving of PDSCH $k_i$, where i=0, 1, 2, . . . . In the DCI, 2 bits are used to indicate a value of the HARQ-ACK/NACK timing, and one of four time differences (i=0, 1, 2, 3) may be indicated. The base station may configure different $k_i$ values or different numbers of bits for different service types or different DCIs. For example, the number of bits for HARQ-ACK/NACK timing in the DCI within common search space of PDCCH is 0 bit, and the HARQ-ACK/NACK timing value is a predefined fixed value by the specification; while the number of bits for HARQ-ACK/NACK timing in the DCI within a UE-specific search space of PDCCH is 2 bits, and the HARQ-ACK/NACK timing value is a set of values configured by higher-layer signaling or predefined by the specification; or the number of bits for HARQ-ACK/NACK timing in a certain DCI or a type of DCIs is defined as 0 bit, and the HARQ-ACK/NACK timing value is predefined by the specification, while the number of bits for HARQ-ACK/NACK timing in other types of DCIs is 2, and the HARQ-ACK/NACK timing value is a set of values configured by higher-layer signaling or predefined by the specification.

According to the exemplary embodiment, HARQ-ACK/NACK timing may indicate a time difference between the downlink time unit in which the PDSCH is received and the uplink time unit in which the HARQ-ACK/NACK is fed back. For example, the downlink time unit in which the PDSCH is received is n, the corresponding uplink time unit in which the HARQ-ACK/NACK is fed back is m, and the HARQ-ACK/NACK timing may indicate m−n.

According to the exemplary embodiment, the time difference between the downlink time unit in which the PDSCH is received and the uplink time unit in which the HARQ-ACK/NACK is fed back is a sum of HARQ-ACK/NACK timing and a given time difference offset $k_0$. For example, HARQ-ACK/NACK timing are 2 bits, the downlink time unit in which the PDSCH is received is n, the corresponding uplink time unit in which the HARQ-ACK/NACK is fed back is m, and the time difference m−n between the downlink time unit in which the PDSCH is received and the uplink time unit in which the HARQ-ACK/NACK is fed back may be $k_0+0, k_0+1, \ldots, k_0+3$.

Here, the time difference offset $k_0$ is configured by higher-layer signaling or predefined by the specification. Different HARQ-ACK/NACK timing values may be predefined and/or $k_0$ may be different values, according to different service types or different DCIs. Preferably, for different DCIs, different HARQ-ACK/NACK timing values are predefined and/or $k_0$s are different values, the HARQ-ACK/NACK timing values in the DCI within a common search space of a downlink control channel PDCCH and/or $k_0$s are a set of values which are predefined by the specification, while the HARQ-ACK/NACK timing values in the DCI within a UE-specific search space of the downlink control channel PDCCH and/or $k_0$s are a set of values which are configured by higher-layer signaling, or, for a certain DCI or a type of DCIs, the HARQ-ACK/NACK timing values and/or $k_0$s are a set of values which are predefined by the specification, and for other types of DCIs, the HARQ-ACK/NACK timing values and/or $k_0$s are a set of values which are configured by higher-layer signaling. Or, multiple sets of HARQ-ACK/NACK timing values and/or $k_0$ values may be predefined by the specification for example, multiple sets of values predefined for UEs having different processing abilities, and the base station semi-statically indicates which set of HARQ-ACK/NACK timing values is adopted. For the TDD system, the HARQ-ACK/NACK timing predefined by the specification may be assumed to indicate an uplink time unit $m_0$ corresponding to an ACK/NACK of the downlink time unit n determined according to TDD configuration, or one of the next one or the next several available uplink time units mi (i>0). Since the uplink time units of the TDD system are often discontinuous, if an absolute time difference of the uplink time unit of the ACK/NACK feedback and the receiving downlink is indicated directly through the DCI, the needed bit overhead is greater. Thus, the uplink time unit of the ACK/NACK feedback may be determined in conjunction with uplink and downlink information of the TDD. The uplink time units $m_0$~$m_i$ determined according to the uplink and downlink information of the TDD may be determined according to uplink and downlink rates of a semi-statically configured TDD, and may also be determined according to the received uplink and downlink rate information indicated by a dynamic signaling. For example, uplink and downlink time slots received by the user equipment in the downlink time unit n indicate 10 time units starting from the current time unit n, i.e., DSUDDDSUDD, and uplink and downlink time slots received in the downlink time unit n+8 indicate 5 time units starting from the current time unit n+8, i.e., DSUUU. Then, it is assumed that ACK/NACK feedback time is indicated still by 2 bits, if UE receives the DCI in the downlink time unit n, the 2 bits indicate the uplink time units n+7, n+10, n+11 and n+12, respectively. Wherein n+7 is a first uplink time unit which satisfies the least time delay of the ACK/NACK feedback, n+10, n+11 and n+12 are the latest second, third and fourth available uplink time units, respectively.

According to the exemplary embodiment, the higher-layer signaling configures an uplink time unit in which the PUCCH may be transmitted. For example, a period and time offset are configured, to determine the uplink time unit in which the PUCCH may be transmitted. In such a case, the HARQ-ACK/NACK timing indicates one or more uplink time units, in which the configured PUCCHs are included, which are greater than or equal to a least time difference between the downlink time unit in which the PDSCH is received and the uplink time unit in which the HARQ-ACK/NACK is fed back and which are closest to the least time difference. Here, the least time difference may be a fixed value, and also, may be different values for different service types or for different UE processing abilities. For example, when the period of the uplink time unit is N1, the uplink time unit n satisfies n mod N1=0, when the HARQ-ACK/NACK timing is 2 bits, it indicates the first, second, third and fourth uplink time units configured according to the said period, which are greater than or equal to a least time difference between the downlink time unit in which the PDSCH is received and the uplink time unit in which the HARQ-ACK/NACK is fed back and which are closest to the least time difference.

According to the exemplary embodiment, in the case where a uplink time unit in which the PUCCH may be transmitted is semi-statically configured at the base station, the HARQ-ACK/NACK timing further indicates whether it indicates a time difference between the downlink time unit in which the predefined PDSCH is and the uplink time unit in which the HARQ-ACK/NACK is fed back, or one or more uplink time units, in which the configured PUCCHs are included, which are greater than or equal to a least time difference between the downlink time unit in which the PDSCH is received and the uplink time unit in which the HARQ-ACK/NACK is fed back and which are closest to the least time difference. For example, the predefined HARQ-ACK/NACK timing of the PDSCH and the ACK/NACK feedback are 3 time units, for example, the PDSCH is received in the downlink time unit n, and the ACK/NACK is fed back in the uplink time unit n+3. The semi-statically configured uplink time unit satisfies n mod N1=0, wherein N1 denotes a period of the semi-statically configured uplink time unit. Then, 1 bit in the DCI of the PDSCH of the downlink time unit n may indicate whether the ACK/NACK is fed back in the uplink time unit n+3 or in the uplink time unit n+N, wherein N>=3, and (n+N) mod N1=0. For the ACK/NACK codebook transmitted in the semi-statically configured uplink time unit, its size may be determined according to N1 downlink time units, and for the ACK/NACK codebook transmitted in a non-semi-statically configured uplink time unit, its size is determined according to one downlink time unit.

Preferably, the control signaling may further include indication information of a size of the HARQ-ACK/NACK codebook.

According to the exemplary embodiment, the base station configures the size of the HARQ-ACK/NACK codebook.

According to the exemplary embodiment, a total number of HARQ processes is configured by the base station, or is predefined by the specification. Moreover, the number of bits of the HARQ-ACK/NACK of each HARQ process is configured by the base station, or is predefined by the specification. The size of the HARQ-ACK/NACK codebook is determined according to the total number of the HARQ processes and the number of the HARQ-ACK/NACKs of each HARQ process.

According to the exemplary embodiment, a HARQ-ACK/NACK feedback window is configured by the base station, or is predefined by the specification. Here, the HARQ-ACK/NACK feedback window is a DL association set consisting of all downlink time units of which the HARQ-ACK/NACKs can be fed back in the same uplink time unit simultaneously based on the set of HARQ-ACK timings. Moreover, the number of bits of the HARQ-ACK/NACK of each downlink time unit in the HARQ-ACK/NACK feedback window is semi-statically configured by the base station, or is predefined by the specification. Thus, the size of the HARQ-ACK/NACK codebook is determined according to the size of the HARQ-ACK/NACK feedback window and the number of bits of the HARQ-ACK/NACK of each downlink time unit in the feedback window. Here, the number of bits of the HARQ-ACK/NACK corresponding to each downlink time unit may be determined according to one of: a maximum number of TBs that may be transmitted in each downlink time unit, a maximum number of coding blocks that may be transmitted in each downlink time unit, and a maximum number of CBGs that may be transmitted in each downlink time unit. Here, the control signaling may include information indicating the number of bits of the HARQ-ACK/NACK corresponding to each downlink time unit each determined according to a configured maximum number of TBs in each downlink time unit, or according to a configured maximum number of coding blocks in each downlink time unit, or according to a configured maximum number of CBGs in each downlink time unit. Preferably, when configuring the number of bits of the HARQ-ACK/NACK corresponding to each downlink time unit according to a configured maximum number of CBGs in each downlink time unit, the HARQ-ACK/NACK bits are determined according to the number of the CBGs, regardless of whether the PDSCH in the downlink time unit is scheduled by TB or e CBG-based DCI.

Preferably, the control signaling may further include a first class DAI, wherein the first class DAI indicates one of the following information: a relative time sequence of the currently scheduled downlink time unit in all the scheduled downlink time units corresponding to the uplink time unit, and bit positions where HARQ-ACK/NACK bits of the currently scheduled downlink time units are in the HARQ-ACK/NACK codebook. The user equipment may also determine sizes of the HARQ-ACK/NACK codebooks corresponding to respective uplink time units, and bit positions where the HARQ-ACK/NACKs corresponding to respective downlink time units corresponding to the respective uplink time units are in the HARQ-ACK/NACK codebook according to the first class DAI. Here, the sizes of the HARQ-ACK/NACK codebooks corresponding to respective uplink time units determined by the first class DAI are variable, so as to ensure that the resource of an uplink control channel may be used effectively.

According to a preferable embodiment of the present disclosure, in the control signaling, the first class DAI and HARQ-ACK/NACK timing may be joint encoded. Thus, the bits of the downlink control signaling may be compressed, so as to ensure that the resource of a downlink control channel may be used effectively.

Preferably, the control signaling may further include a second class DAI. Here, the second class DAI indicates one of the following information: a total number of downlink time units of all the scheduled downlink time units corresponding to the uplink time units, a total number of downlink time units from a first downlink time unit to the current downlink time unit in all the scheduled downlink time units corresponding to the uplink time units, and a total number of bits the HARQ-ACK/NACK codebook. The user equipment may determine the sizes of the HARQ-ACK/NACK codebooks corresponding to the respective uplink time units by using the second class DAI. Here, the sizes of the HARQ-ACK/NACK codebooks corresponding to respective uplink time units determined by the second class DAI are variable, so as to ensure that the resource of the uplink control channel may be used effectively.

According to the preferable embodiment of the present disclosure, in the control signaling, the first class DAI, the second class DAI and the HARQ-ACK/NACK timing may be joint encoded. Thus, the bits of the downlink control signaling may be compressed, so as to ensure that the resource of the downlink control channel may be used effectively.

Preferably, The control signaling may comprise a third class DAI, wherein, the content indicated by the third class DAI is the same as the content indicated by the second class DAI, or the third class DAI indicates the total number of bits of the received HARQ-ACK/NACK codebook expected by the base station and the total number of bits of the HARQ-ACK/NACK corresponding to the PDSCH actually scheduled by the base station is equal to or smaller than the expected total number of bits. The control signaling comprising the first class DAI and/or the second class DAI and the control signaling comprising the third class DAI may be independent signals one of which, for example, is a DCI transmitted by the scheduling of the downlink, and another one is a DCI transmitted by the scheduling of the uplink.

The above preferable embodiments will be described in details below in conjunction with the exemplary embodiments of the present disclosure. Returning back to refer to FIG. 1, and then at step 102, the user equipment, based on the control signaling, determines an uplink time unit in which the HARQ-ACK/NACK corresponding to the received PDSCH is fed back, a size of a HARQ-ACK/NACK codebook for the uplink time unit, and bit positions where the HARQ-ACK/NACKs corresponding to respective downlink time units corresponding to the uplink time unit is in the HARQ-ACK/NACK codebook. Subsequently, the specific embodiments of the step will be described in details with reference to FIGS. 2-13.

Next, at step 103, the HARQ-ACK/NACK codebook is generated based on the size of the HARQ-ACK/NACK codebook and the bit positions where the HARQ-ACK/NACKs corresponding to the respective downlink time units corresponding to the uplink time unit is in the HARQ-ACK/NACK codebook. Subsequently, the specific embodiments of the step will be described in details with reference to FIGS. 2-13.

At last, at step 104, the HARQ-ACK/NACK codebook generated at step S107 is transmitted in the uplink time unit.

A first exemplary embodiment according to the present disclosure will be described below.

In the first exemplary embodiment, the control signaling received from the base station by the user equipment may further include a size of the HARQ-ACK/NACK codebook configured by the base station.

Thus, at step 103, the user equipment may determine the size of the HARQ-ACK/NACK codebook for the uplink time unit based on the size of HARQ-ACK/NACK codebook configured by the base station.

According to one aspect of the first exemplary embodiment, the control signaling further includes a total number of HARQ processes which are supportable in one uplink time unit and a HARQ process ID, or the control signaling further includes the HARQ process ID, and the total number of the HARQ processes which are supportable in one uplink time unit is predefined by the specification. Thus, the user equipment may generate a HARQ-ACK/NACK codebook for the uplink time unit based on the HARQ processes.

Figure 2:
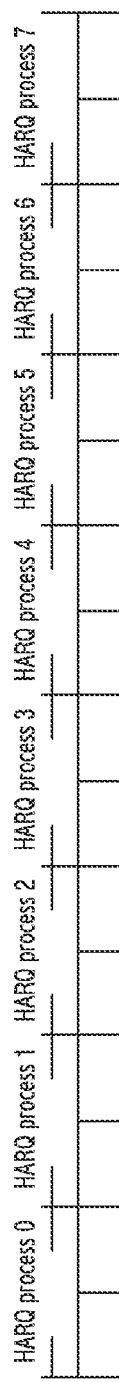
FIG. 2 is a diagram of a HARQ process according to a first embodiment of the present disclosure.
Figure 3:
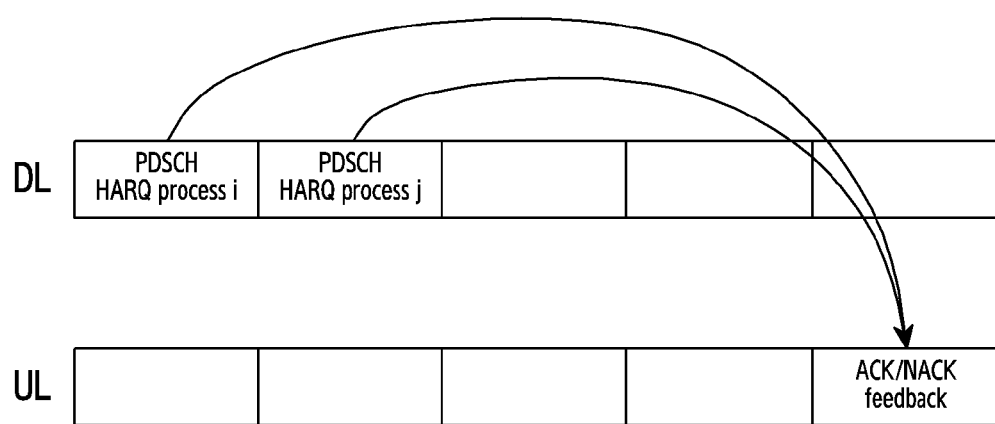
FIG. 3 is a diagram of uplink and downlink mapping based on the HARQ process according to the first embodiment of the present disclosure.

Referring to FIG. 2, FIG. 2 is a diagram of a HARQ process according to the first embodiment of the present disclosure. In the example of FIG. 2, it is assumed that the total number of the HARQ processes which are supportable in the uplink time unit is 8. Here, the total number of the HARQ processes which are supportable in the uplink time unit may be included in the control signaling, or may be predefined by the specification. The HARQ-ACK/NACK corresponding to each HARQ process of receiving the PDSCH in the downlink time unit may be mapped into the HARQ-ACK/NACK codebook of the uplink time unit, as shown in FIG. 3.

Thus, at step 102, the user equipment may, based on the size of the HARQ-ACK/NACK codebook, the total number of the HARQ processes which are supportable in one uplink time unit and the ID of each HARQ process, determine the bit positions where the HARQ-ACK/NACKs corresponding to the respective downlink time units corresponding to the uplink time unit is in the HARQ-ACK/NACK codebook.

In specific, a minimum number of bits Y that may be occupied by the HARQ-ACK/NACK corresponding to each HARQ process is obtained by dividing the determined size X of the HARQ-ACK/NACK codebook by a total number L of the HARQ processes which are supportable in one uplink time unit, that is, $Y=(X/L)$.

Then, start points where the HARQ-ACK/NACKs corresponding to the respective downlink time units corresponding to the uplink time units is in the HARQ-ACK/NACK codebook are obtained by multiplying the minimum number of bits that may be occupied by the HARQ-ACK/NACK corresponding to each HARQ process by IDs i (for example, i=0, 1, . . . L−1) of the HARQ processes of the respective downlink time units corresponding to the uplink time units, that is, $Y*i$, i=0, 1, . . . L−1.

At step 103, the user equipment may generate the HARQ-ACK/NACK based on the HARQ processes. Here, the HARQ process may be divided into a valid HARQ process and an invalid HARQ process. The valid HARQ process indicates a HARQ process in which the PDSCH is received in the downlink time unit corresponding to the uplink time unit, a time difference between the uplink time unit and the downlink time unit in which the PDSCH is received is greater than or equal to a predefined least time delay; the invalid HARQ process indicates a HARQ process in which the PDSCH is not received in the downlink time unit corresponding to the uplink time unit, and/or a HARQ process in which the PDSCH is received in the downlink time unit, but the time difference between the uplink time unit and the downlink time unit in which the PDSCH is received is smaller than the predefined least time delay, and/or a HARQ process in which the PDSCH is received in the downlink time unit, but the HARQ-ACK/NACK of the PDSCH has been fed back before the uplink time unit.

Preferably, the valid HARQ process indicates a HARQ process in which the HARQ-ACK/NACK is fed back in the uplink time unit, that is, the UE receives the PDSCH in the downlink time unit, and the HARQ-ACK/NACK of the PDSCH is fed back in the uplink time unit. If the UE receives the PDSCH in the downlink time unit, but the HARQ-ACK/NACK of the PDSCH is not fed back in the uplink time unit, as for the uplink time unit, the HARQ process is an invalid HARQ process.

The user equipment generates the HARQ-ACK/NACK according to the received PDSCH with respect to the valid HARQ process, and inserts the HARQ-ACK/NACK generated with respect to the valid HARQ process into the HARQ-ACK/NACK codebook based on the start point where the HARQ-ACK/NACK corresponding to the downlink time unit corresponding to the valid HARQ process is in the HARQ-ACK/NACK codebook.

The user equipment generates the HARQ-NACK according to a predefined rule with respect to an invalid HARQ process, and inserting the HARQ-NACK generated with respect to the invalid HARQ process into the HARQ-ACK/NACK codebook based on the start point where the HARQ-ACK/NACK corresponding to the downlink time unit corresponding to the invalid HARQ process is in the HARQ-ACK/NACK codebook.

When a number of bits of the HARQ-ACK/NACK corresponding to the valid HARQ process is greater than the minimum bit number that may be occupied by the HARQ-ACK/NACK corresponding to each HARQ process, the user equipment enables the HARQ-ACK/NACK corresponding to the valid HARQ process to occupy a bit position of the HARQ-ACK/NACK corresponding to the next HARQ process. For example, in specific, a number of bits Z of the ACK/NACK of the HARQ process (i.e., the valid HARQ process) in which the PDSCH is received in the corresponding time unit may be greater than and equal to Y. At this time, the bits of the ACK/NACK corresponding to the HARQ process may occupy the bits of the ACK/NACK of the next HARQ process.

When a bit position of the HARQ-ACK/NACK corresponding to the invalid HARQ process is occupied by the HARQ-ACK/NACK corresponding to the valid HARQ process, the user equipment determines the number of bits of the HARQ-ACK/NACK corresponding to the invalid HARQ process as a difference between the number of bits that may be occupied by the HARQ-ACK/NACK corresponding to each HARQ process and the number of bits occupied by the HARQ-ACK/NACK corresponding to the valid HARQ process. For example, a number of bits Z' of the ACK/NACK of the HARQ process in which the PDSCH is not received in the corresponding time unit (i.e., the invalid HARQ process) is determined according to whether it is occupied by the ACK/NACK of the valid HARQ process. If it is not occupied by the ACK/NACK of the valid HARQ process, Z'=Y. If it is occupied by the ACK/NACK of the valid HARQ process, and it is assumed that the occupied number of bits is Y1, then, Z'=Y−Y1. When Y=Y1, Z=0.

Thus, according to the embodiment of the present disclosure, in order to avoid overlapping of the bits of the ACK/NACK of the valid HARQ process, the base station should avoid scheduling neighboring HARQ processes in which the ACK/NACKs are fed back in the same uplink time unit when performing a schedule.

Figure 4:
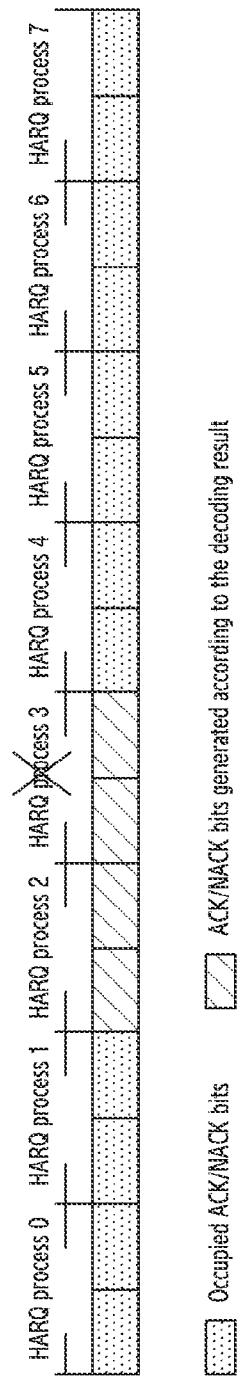
FIG. 4 is a diagram of generating the HARQ-ACK/NACK based on the HARQ process according to the first embodiment of the present disclosure.

FIG. 4 is a diagram of generating a HARQ-ACK/NACK based on a HARQ process according to the first embodiment of the present disclosure.

It is assumed that X=16, L=8, Y=2, and Z=4, a length of an ACK/NACK codebook is 16. If HARQ process 2 receives the PDSCH in the corresponding time unit, 4-bits of ACK/NACK is generated according to a decoding result of the PDSCH; and if other HARQ processes do not receive the PDSCH in the corresponding time unit, 0th to 3rd bits in the ACK/NACK codebook correspond to HARQ process 0 and HARQ process 1, respectively. Due to a non-schedule, Y=2-bits of NACK is generated, respectively, 4th to 7th bits correspond to the HARQ process 2, and 4-bits of ACK/NACK is generated according to the decoding result of the PDSCH. 8th to 15th bits correspond to HARQ process 4 to HARQ process 7, respectively, and due to the non-schedule, Y=2-bits of NACK is generated, respectively. It is not difficult to see that 4-bits of the HARQ process 2 occupy a bit position of 2-bits of the HARQ process 3.

In this example, if the base station further needs to schedule other HARQ processes, the base station should avoid scheduling the HARQ process 3. This is because the ACK/NACK bits of the HARQ process 3 have been occupied by the HARQ process 2. In such a case, the base station may schedule, for example, the HARQ process 4.

Figure 5:
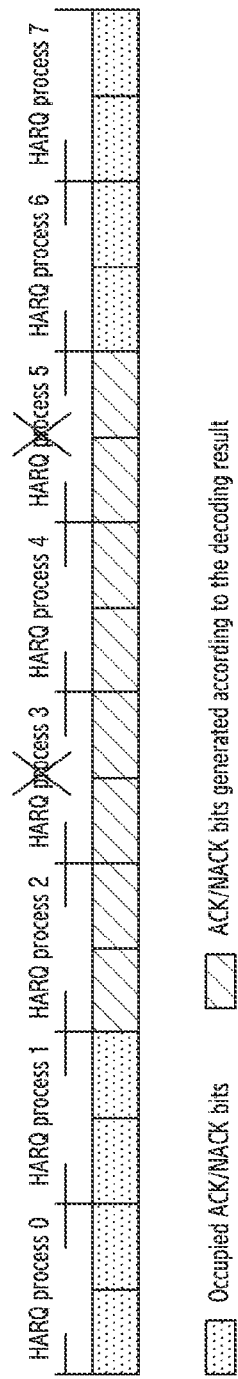
FIG. 5 is another diagram of generating the HARQ-ACK/NACK based on the HARQ process according to the first embodiment of the present disclosure.

FIG. 5 is another diagram of generating the HARQ-ACK/NACK based on the HARQ process according to the first embodiment of the present disclosure.

Referring to FIG. 5, it is assumed that X=16, L=8, Y=2, and Z=4, a length of an ACK/NACK codebook is 16. If the HARQ process 2 and the HARQ process 4 receive the PDSCHs in the corresponding time unit, 4-bits of ACK/NACKs are generated according to decoding results of the PDSCHs; and if other HARQ processes do not receive the PDSCHs in the corresponding time unit, 0th to 3rd bits in the ACK/NACK codebook correspond to HARQ process 0 and HARQ process 1, respectively. Due to a non-schedule, Y=2-bits NACK is generated, respectively. 4th to 7th bits correspond to the HARQ process 2, and 4-bits of ACK/NACK is generated according to the decoding result of the PDSCH. 8th to 11th bits correspond to the HARQ process 4, and 4-bits of ACK/NACK is generated according to the decoding result of the PDSCH. 12th to 15th bits correspond to HARQ process 6 and HARQ process 7, respectively, and due to the non-schedule, Y=2-bits of NACK is generated, respectively. It is not difficult to see that, 4-bits of the HARQ process 2 occupy a position of 2-bits of the HARQ process 3, and 4-bits of the HARQ process 4 occupy a position of 2-bits of the HARQ process 5.

In this example, if the base station further needs to schedule other HARQ processes, the base station should avoid scheduling the HARQ process 3 and the HARQ process 5. This is because the ACK/NACK bits of the HARQ process 3 have been occupied by the HARQ process 2, and the ACK/NACK bits of the HARQ process 5 have been occupied by the HARQ process 4. In such a case, the base station may schedule, for example, the HARQ process 6.

It is worthy of noting that, in the above examples, the HARQ IDs correspond to time sequences of the downlink time units one by one, but the present disclosure is also suitable for the situation that sizes of the HARQ IDs do not correspond to the time sequences of the downlink time units one by one. For example, the downlink time unit n is a HARQ process having a HARQ ID=6, and the downlink time unit n+4 is a HARQ process having a HARQ ID=1. Then, HARQ-ACK bits are mapped according to sequences of the HARQ IDs all the same, that is, the HARQ-ACK bits of HARQ ID=1 is before those of HARQ ID=6.

According to another aspect of the first exemplary embodiment, the user equipment may generate a HARQ-ACK/NACK codebook for the uplink time unit based on the downlink time unit. Thus, the user equipment may also determine bit positions where the HARQ-ACK/NACKs corresponding to the PDSCHs of the respective downlink time units is in the HARQ-ACK/NACK codebook based on downlink time unit indexes.

In specific, firstly, the user equipment determines a size of a feedback window based on HARQ-ACK/NACK timing and the downlink time unit indexes of the respective downlink time units corresponding to the uplink time unit. Here, the feedback window is a set of all downlink time units of which the HARQ-ACK/NACKs may be in the uplink time unit simultaneously and which are determined by all possible values of the HARQ-ACK/NACK timing, and the downlink time unit indexes of the respective downlink time units corresponding to the uplink time unit represent the order of the respective downlink time units corresponding to the uplink time units in the feedback window, respectively.

Figure 6:
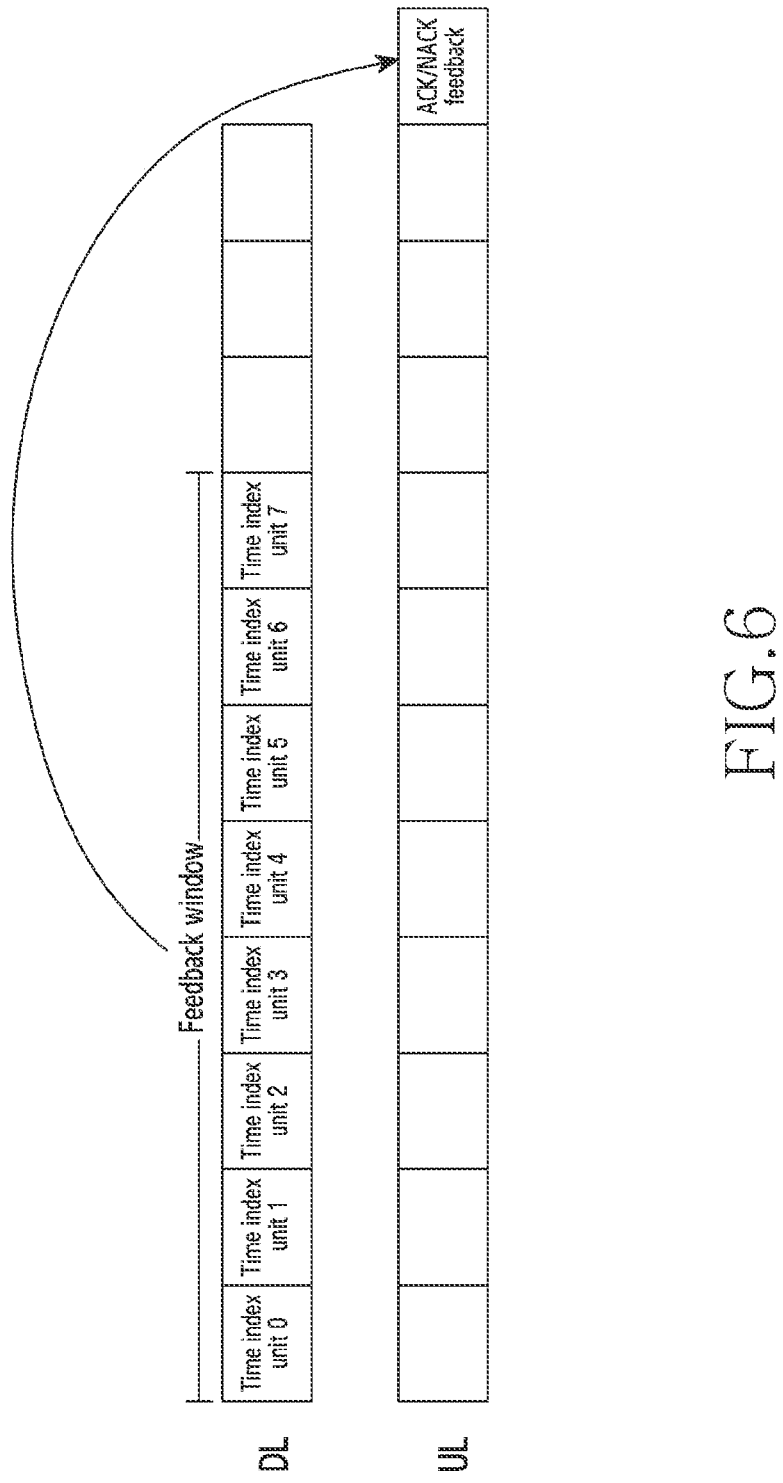
FIG. 6 is a diagram of uplink and downlink mapping based on a downlink time unit according to the first embodiment of the present disclosure.

For example, FIG. 6 is a diagram of uplink and downlink mapping based on a downlink time unit according to the first embodiment of the present disclosure.

Referring to FIG. 6, it is assumed that the size of the feedback window is L, the time unit index corresponding to one time unit which is the earliest in time within the feedback window is minimum, for example, it is 0, while within the feedback window, the time unit index corresponding to one time unit which is the latest in time is maximum, for example, it is L−1. The time units within the feedback window may be continuous, and also may be discontinuous. For example, if the number of bits indicating the HARQ-ACK/NACK timing in downlink control information (DCI) is N, $2^N$ time values may be indicated, that is, in the same uplink time unit, HARQ-ACK/NACKs of the PDSCHs of $2^N$ downlink time units may be fed back at most. Then, the size of the feedback window is $L=2^N$. The HARQ-ACK/NACK timing value indicated in the DCI may be predefined according to the standard. For example, 3-bits may indicate that a difference m−n between the time unit n of the PDSCH and the corresponding time unit of the HARQ-ACK/NACK is 0, 1, . . . , 7, the size of the feedback window is L=8, and the time units within the feedback window are continuous.

For another example, there are 2-bits indicating the HARQ-ACK/NACK timing in the DCI, the size of the feedback window is L=4, if the values of the HARQ-ACK/NACK timing (i.e., a time relationship between the PDSCH and the HARQ-ACK/NACK) indicated in a DCI configured by higher-layer signaling are 0, 2, 4, and 6, the feedback window is constituted by 4 time units among which an interval is 2 from each other.

For a still example, some of the time units within the feedback window may be time units in which downlink PDSCH is not transmitted, for example, in a TDD system, if a time unit is configured as an uplink time unit, the downlink PDSCH is not allowed to transmit in the time unit. Then, such a time unit may be removed when calculating the size L of the feedback window. Preferably, the time units in which the PDSCH is not allowed to transmit may be determined through a semi-static signaling (such as RRC signaling), and may also be determined through a dynamic signaling (such as DIC indication). Preferably, the time units in which the PDSCH is not allowed to transmit may be removed regardless of which are indicated by what signaling, when calculating the size L of the feedback window. According to another aspect of the present disclosure, when calculating the size L of the feedback window, if the time units in which the PDSCH is not allowed to transmit are indicated by the semi-static signaling, the time units may be removed, while if t the time units in which the PDSCH is not allowed to transmit are indicated by the dynamic signaling, the time units may not be removed.

Next, the minimum number of bits that may be occupied by the HARQ-ACK/NACK corresponding to each downlink time unit is obtained by dividing the size of the HARQ-ACK/NACK codebook by the size of the feedback window. For example, the minimum number of bits that may be occupied by the HARQ-ACK/NACK corresponding to each downlink time unit may be obtained according to the size X of the ACK/NACK codebook configured by the base station and the size L of the feedback window, that is, Y=X/L. Or, the base station configures the number of bits of the HARQ-ACK/NACK corresponding to each downlink time unit, for example, as described above, the configured number of bits is the maximum number of CBGs that can be transmitted. If the base station configures the UE such that the UE may dynamically switch between the scheduling based on the CBG and the scheduling based on the TB group, the number of the bits of the HARQ-ACK of the UE is always determined according to the scheduling based on the CBG, that is, determined according to maximum number of CBGs that can be transmitted.

Then, start points where the HARQ-ACK/NACKs corresponding to the respective downlink time units corresponding to the uplink time units is in the HARQ-ACK/NACK codebook are obtained by multiplying the minimum number of bits that may be occupied by the HARQ-ACK/NACK corresponding to each downlink time unit by the downlink time unit indexes of the respective downlink time units corresponding to the uplink time units. That is to say, the start point of the HARQ-ACK/NACK corresponding to the downlink time unit i is $Y*i$, $i=0, 1, \ldots, L-1$.

After the start points of the HARQ-ACK/NACKs are determined according to the above method, the ACK/NACKs may be inserted into the HARQ-ACK/NACK codebook with respect to the valid downlink time unit and the invalid downlink time unit. Here, the valid downlink time unit indicates a downlink time unit in which the PDSCH is received and the uplink time unit of the HARQ-ACK/NACK corresponding to the PDSCH is the said uplink time unit. The invalid downlink time unit indicates a downlink time unit in which the PDSCH is not received or a downlink time unit in which the PDSCH is received but the uplink time unit of the HARQ-ACK/NACK corresponding to the PDSCH is not the said uplink time unit. That is to say, in the downlink time unit, although the PDSCH is received, since an ACK/NACK feedback time unit of the received PDSCH is not the said ACK/NACK feedback time unit, it is deemed that the downlink time unit is an invalid downlink time unit in comparison with the ACK/NACK feedback time unit.

A HARQ-ACK/NACK is generated according to the received PDSCH with respect to the valid downlink time unit, and the HARQ-ACK/NACK generated with respect to the valid downlink time unit is inserted into the HARQ-ACK/NACK codebook based on the start point where the HARQ-ACK/NACK corresponding to the valid downlink time unit is in the HARQ-ACK/NACK codebook.

A HARQ-NACK is generated according to a predefined rule with respect to the invalid downlink time unit, and the HARQ-NACK generated with respect to the invalid downlink time unit is inserted into the HARQ-ACK/NACK codebook based on the start point where the HARQ-ACK/NACK corresponding to the valid downlink time unit is in the HARQ-ACK/NACK codebook, so as to occupy a bit position.

Preferably, a HARQ-NACK is generated according to the predefined rule with respect to a downlink time unit in which the PDSCH is not received in the invalid downlink time units, and the generated HARQ-NACK is inserted into the HARQ-ACK/NACK codebook based on the bit position where the HARQ-ACK/NACK corresponding to the downlink time unit in which the PDSCH is not received is in the HARQ-ACK/NACK codebook, so as to occupy the bit position. However, with respect to a downlink time unit in which the PDSCH is received but the uplink time unit of the HARQ-ACK/NACK corresponding to the PDSCH is not the said uplink time unit, a HARQ-ACK/NACK is generated according to the PDSCH, and the generated HARQ-ACK/NACK is inserted into the HARQ-ACK/NACK codebook.

When the number of bits of the HARQ-ACK/NACK corresponding to the valid downlink time unit is greater than the minimum number of bits that may be occupied by the HARQ-ACK/NACK corresponding to each downlink time unit, the HARQ-ACK/NACK corresponding to the valid downlink time unit is enabled to occupy a bit position of the HARQ-ACK/NACK corresponding to the next downlink time unit. When a bit position of the HARQ-ACK/NACK corresponding to the invalid downlink time unit is occupied by the HARQ-ACK/NACK corresponding to the valid downlink time unit, the number of bits of the HARQ-ACK/NACK corresponding to the invalid downlink time unit is determined as a difference between the number of bits that may be occupied by the HARQ-ACK/NACK corresponding to each downlink time unit and an occupied number of bits of the HARQ-ACK/NACK corresponding to the valid downlink time unit. That is to say, a number of bits Z' of the HARQ-ACK/NACK of the corresponding downlink time unit in which the PDSCH is not received is determined according to whether a bit position thereof is occupied by the HARQ-ACK/NACK of the valid downlink time unit. If the bit position thereof is not occupied by the HARQ-ACK/NACK of the valid downlink time unit, Z'=Y. If the bit position thereof is occupied by the HARQ-ACK/NACK of the valid HARQ process, and it is assumed that the occupied number of bits is Y1, then, Z'=Y−Y1. When Y1=Y, T=0.

Thus, in order to avoid overlapping of the bits of the HARQ-ACK/NACKs of the PDSCHs of the valid time units, when the base station performs a schedule, the number L' of the scheduled downlink time units of which the HARQ-ACK/NACKs are fed back in the same uplink time unit must be smaller than or equal to X/Z. For example, when X=16, L=8, and Z=4, a size L of a feedback time window determined according to the HARQ-ACK/NACK timing is 8, however, within the feedback window, the number L' of the downlink time units of which the HARQ- ACK/NACKs are fed back in the same uplink time unit, that may be scheduled by the base station, is smaller than 4, (X/Z).

Further, in order to avoid overlapping of the bits of the HARQ-ACK/NACKs of the PDSCHs of the valid time units, when the base station performs a schedule, the PDSCHs of neighboring time units in which the HARQ-ACK/NACKs are fed back in the same uplink time unit should be avoided being scheduled.

Figure 7:
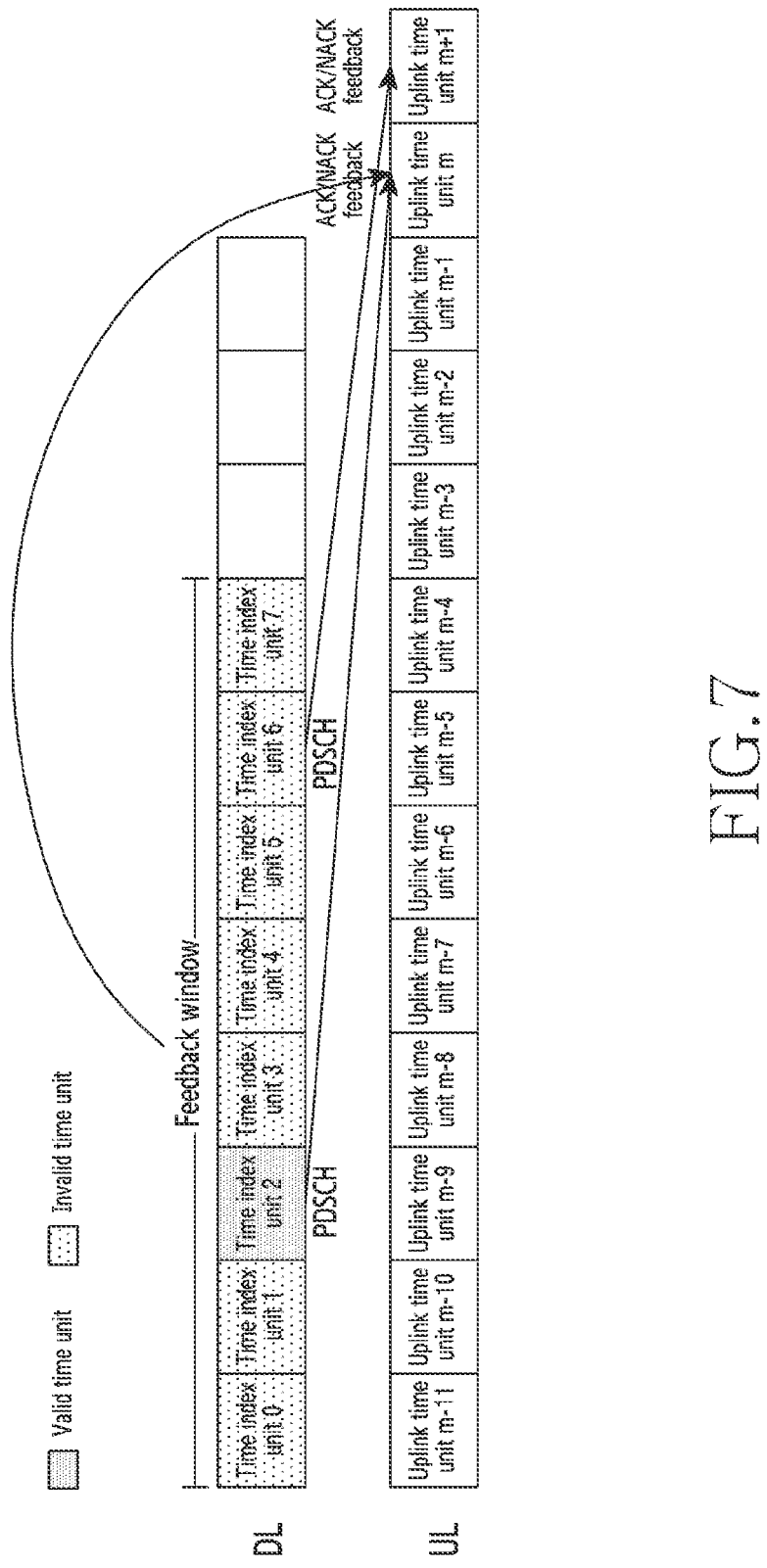
FIG. 7 is a diagram of generating the HARQ-ACK/NACK based on the downlink time unit according to the first embodiment of the present disclosure.

FIG. 7 is a diagram of generating the HARQ-ACK/NACK based on the downlink time unit according to the first embodiment of the present disclosure.

Referring to FIG. 7, it is assumed that X=16, L=8, Y=2, and Z=4, a length of a HARQ-ACK/NACK codebook is 16. It is assumed that a HARQ-ACK/NACK will be fed back in an uplink time unit m, downlink time units included in a feedback window are m−11, m−10, . . . , m−4, and the length thereof is 8. The time unit index of the downlink time unit m−11 is 0, by that analogy, the time unit index of the downlink time unit m−4 is 7.

If the user equipment receives the PDSCH in the time unit index 2, 4-bits of HARQ-ACK/NACK is generated according to a decoding result of the PDSCH; and if the user equipment does not receive the PDSCH in the other time units, 0th to 3rd bits in the HARQ-ACK/NACK codebook correspond to time unit indexes 0 and 1, respectively, due to non-schedule, Y=2-bits of HARQ-NACK is generated, respectively; 4th to 7th bits correspond to the time unit index 2, and the 4-bits of HARQ-ACK/NACK is generated according to the decoding result of the PDSCH. It is not difficult to see that, the 4-bits of the time index unit 2 occupy a position of 2-bits of the time index unit 3. 8th to 15th bits correspond to downlink time unit indexes 4-7, since the downlink time units 4, 5 and 7 are not scheduled, the downlink time unit 6 is scheduled, but its corresponding HARQ-ACK/NACK is fed back in the uplink time unit m+1, with respect to the uplink time unit m, they are invalid time units. Therefore, 8th to 15th bits are all HARQ-NACKs. Similarly, with respect to the uplink time unit m+1, the downlink time units included in the feedback window are m−10, m−9, . . . , m−3, and the length thereof is 8. Within the feedback window, only the downlink time unit m−5 (the time unit index thereof is 5) schedules the PDSCH and the HARQ-ACK/NACK is fed back in the uplink time unit m+1, the size of the HARQ-ACK/NACK codebook is 16, and at 12th to 15th bits, the HARQ-ACK/NACK is generated according to the received PDSCH, while at 0th to 11th bits, HARQ-NACK is generated.

According to the first exemplary embodiment of the present disclosure, the feedback overhead of the ACK/NACK may be effectively controlled by configuring the size of the HARQ-ACK/NACK codebook by the base station, and uncertainty of the HARQ-ACK/NACK codebook may be avoided simultaneously. The base station determines the size of the HARQ-ACK/NACK codebook according to the schedule flexibility and the feedback overhead. It is not difficult to see that, in the present embodiment, even if the UE misses detecting the scheduled PDSCH, which will not cause problems of uncertainty of size of the HARQ-ACK/NACK feedback codebook or uncertainty of sequences of the HARQ-ACK/NACK bits. Because the size of the HARQ-ACK/NACK feedback codebook is configured by higher-layer signaling, the start point of the HARQ-ACK/NACK bit of each HARQ process or each downlink time unit is also fixed.

A second exemplary embodiment according to the present disclosure will be described below.

In a second exemplary embodiment of the present disclosure, at step 102, a user equipment semi-statically determines a size of a HARQ-ACK/NACK codebook according to a size of a feedback window corresponding to a HARQ-ACK/NACK in an uplink time unit. Here, the DL association set consisting of all downlink time units of which the HARQ-ACK/NACKs may be fed back in the same uplink time unit simultaneously based on the set of HARQ-ACK timings is called a feedback window.

In specific, the user equipment may determine the size of the feedback window according to a number of possible HARQ-ACK/NACK timing candidates. For example, the size of the feedback window corresponding to the uplink time unit is obtained by calculating $2^N$, wherein the N is the number of bits for HARQ-ACK/NACK timing indicated by DCI (Downlink Control Information); and the size of the HARQ-ACK/NACK codebook for the uplink time unit is obtained by the size of the feedback window corresponding to the same uplink time unit and a number of bits of the HARQ-ACK/NACK corresponding to each downlink time unit. Here, the number of bits of the HARQ-ACK/NACK corresponding to each downlink time unit is predefined by the specification or configured by higher-layer signaling.

Preferably, the number of bits of the HARQ-ACK/NACK corresponding to each downlink time unit may be determined according to a maximum number of Transmission Blocks (TB) that may be transmitted in each downlink time unit.

Preferably, the number of bits of the HARQ-ACK/NACK corresponding to each downlink time unit may be determined according to a maximum number of Coding Blocks (CB) that may be transmitted in each downlink time unit.

Preferably, for semi-static HARQ-ACK feedback, the number of bits of the HARQ-ACK/NACK corresponding to each downlink time unit may be determined according to a maximum number of CBGs that may be transmitted in each downlink time unit. If the base station configures the UE such that the UE may dynamically switch between the scheduling based on the CBG and the scheduling based on the TB, the number of the bits of the HARQ-ACK of the UE is always determined according to maximum number of CBGs that can be transmitted. For example, the base station configures the scheduling based on the CBG for the UE, and configures two DCIs, one of which is for CBG-based scheduling, and another one is for TB-based scheduling. The base station may dynamically use any one of the DCIs to schedule the UE, but when the UE feeds back the HARQ-ACKs, the number of the bits of the HARQ-ACK of the UE is always determined according to the maximum number of CBGs that can be transmitted. It is assumed the maximum number of CBGs that can be transmitted is 4, when the base station performs a scheduling of the TB to schedule a transmission of one TB, the UE still feeds back 4 bits of HARQ-ACK, wherein, the first bit is generated according to the decoding result of the TB, and the other three bits are occupied bits, for example, NACKs. If the serving carrier may support a transmission of two TBs, and a scheduling based on CBG is configured, one implement method is that the HARQ-ACK bits are always equal to (2*the maximum number of CBGs that can be transmitted) no matter whether the dynamic scheduling by the base station is based on CBG or TB, and another implement method is that the HARQ-ACK bits are always equal to (the maximum number of CBGs that can be transmitted) no matter whether the dynamic scheduling by the base station is based on CBG or TB, which may be independent from the spatial bundling by RRC signaling configuration in the existing system, for example, once the scheduling based on TB is configured, the HARQ-ACK bits are always equal to (the maximum number of CBGs that can be transmitted), without the RRC configuration signaling, or there is another RRC configuration signaling independent from an existing signaling.

Preferably, the control signaling may include information indicating whether the number of bits of the HARQ-ACK/NACK corresponding to each downlink time unit each is determined according to a maximum number of TBs that may be transmitted in each downlink time unit, or according to a maximum number of coding blocks that may be transmitted in each downlink time unit, or according to a maximum number of CBGs that may be transmitted in each downlink time unit.

According to an exemplary embodiment, the size of the HARQ-ACK/NACK codebook for the uplink time unit is obtained by multiplying the size of the feedback window corresponding to the uplink time unit by a number of bits of the HARQ-ACK/NACK corresponding to each downlink time unit.

For example, if N-bits are adopted to indicate the HARQ-ACK/NACK timing (i.e., timing relation between the PDSCH and the HARQ-ACK/NACK) in downlink control information (DCI), M=$2^N$, that is, in the same uplink time unit, ACK/NACKs of the PDSCHs of M downlink time units may be fed back at most. Then, the size of an ACK/NACK codebook is a function of M. For example, the size of the codebook is M*Z, wherein Z is the number of bits of the HARQ-ACK/NACK corresponding to each downlink time unit.

According to another exemplary embodiment, for dynamic HARQ-ACK feedback, if the numbers of bits of the HARQ-ACK/NACKs in the respective downlink time units are not equal, for example, in some of the downlink time units the TB-based HARQ-ACK/NACK feedback is performed, and in other downlink time units the CBG-based HARQ-ACK/NACK feedback is performed, the size of the HARQ-ACK/NACK codebook is determined by adding the numbers of bits of the HARQ-ACK/NACK feedbacks of all downlink time units within the feedback window.

Preferably, some of the downlink time units within value ranges of the HARQ-ACK/NACK timing indicated by the DCI are time units in which downlink PDSCH is not allowed to transmit, it needs to determine the size of the HARQ-ACK/NACK codebook after removing the time units. For example, in a TDD system, if the time units are configured as uplink time units, for example, 3-bits indicate the HARQ-ACK/NACK timing, a difference m−n between a time unit n that may indicate the PDSCH to a time unit m corresponding to the HARQ-ACK/NACK is k0+0, k0+1, . . . , k0+7. If time units m−k0 and m−k0−1 are uplink time units, the size of the HARQ-ACK/NACK codebook is determined according to M=(8−2)=6.

Preferably, the time units in which the PDSCH is not allowed to transmit may be determined through a semi-static signaling, such as a RRC signaling, and may also be determined through a dynamic signaling, such as a DCI indication.

Preferably, the size of the feedback window corresponding to the uplink time unit is obtained by removing the downlink time units in which the PDSCH is not allowed to transmit which are indicated by the signaling, when calculating the size of the HARQ-ACK/NACK codebook.

Preferably, the size of the feedback window corresponding to the uplink time unit is obtained by removing the downlink time units in which the PDSCH is not allowed to transmit which are indicated by the semi-static signaling, and is obtained without removing the downlink time units in which the PDSCH is not allowed to transmit which are indicated by the dynamic signaling, when calculating the size of the HARQ-ACK/NACK codebook. This advantage is to avoid a problem that the size of the ACK/NACK codebook generated by the user equipment is not consistent with the size of the ACK/NACK codebook desired by the base station due to the user equipment misses detecting or mistakes detecting the dynamic signaling.

According to one aspect of the second embodiment of the present disclosure, at step 102, the user equipment may determine the size of the HARQ-ACK/NACK codebook for the uplink time unit based on the size of HARQ-ACK/NACK codebook configured by the base station.

The control signaling may further include a total number of HARQ processes which are supportable in one uplink time unit and HARQ process IDs, or the control signaling further includes HARQ process IDs, and the total number of the HARQ processes which are supportable in one uplink time unit is predefined by the specification. Thus, the user equipment may generate a HARQ-ACK/NACK codebook for the uplink time unit based on the HARQ processes.

Thus, at step 102, the user equipment may determine the bit positions where the HARQ-ACK/NACKs corresponding to the respective downlink time units corresponding to the uplink time unit are in the HARQ-ACK/NACK codebook, based on the size of the HARQ-ACK/NACK codebook, the total number of the HARQ processes which are supportable in one uplink time unit and the ID of each HARQ process.

In specific, a minimum number of bits Y that may be occupied by the HARQ-ACK/NACK corresponding to each HARQ process is obtained by dividing the determined size X of the HARQ-ACK/NACK codebook by the total number L of the HARQ processes which are supportable in one uplink time unit, that is, Y=(X/L).

Then, start points where the HARQ-ACK/NACKs corresponding to the respective downlink time units corresponding to the uplink time unit are in the HARQ-ACK/NACK codebook are obtained by multiplying the minimum number of bits that may be occupied by the HARQ-ACK/NACK corresponding to each HARQ process by IDs i (for example, i=0, 1, . . . L−1) of the HARQ processes of the respective downlink time units corresponding to the uplink time unit, that is, Y*i, i=0, 1, . . . L−1.

At step 103, the user equipment may generate the HARQ-ACK/NACKs based on the HARQ processes. Here, the HARQ process may be divided into a valid HARQ process and an invalid HARQ process. The valid HARQ process indicates a HARQ process in which the PDSCH is received in the downlink time unit corresponding to the uplink time unit, a time difference between the uplink time unit and the downlink time unit in which the PDSCH is received is greater than or equal to the predefined least time delay. The invalid HARQ process indicates a HARQ process in which the HARQ process of the PDSCH is not received in the downlink time unit corresponding to the uplink time unit, and/or a HARQ process in which the PDSCH is received in the downlink time unit, but the time difference between the uplink time unit and the downlink time unit in which the PDSCH is received is smaller than the predefined least time delay, and/or a HARQ process in which the PDSCH is received in the downlink time unit, but the HARQ-ACK/NACK of the PDSCH has been fed back before the uplink time unit.

Preferably, the valid HARQ process indicates a HARQ process in which the HARQ-ACK/NACK is fed back in the uplink time unit, that is, the UE receives the PDSCH in the downlink time unit, and feeds back the HARQ-ACK/NACK of the PDSCH in the uplink time unit. If the UE receives the PDSCH in the downlink time unit, but does not feed back the HARQ-ACK/NACK of the PDSCH in the uplink time unit, the HARQ process is an invalid HARQ process with respect to the uplink time unit.

The user equipment generates a HARQ-ACK/NACK according to the received PDSCH with respect to the valid HARQ process, and inserts the HARQ-ACK/NACK generated with respect to the valid HARQ process into the HARQ-ACK/NACK codebook based on the start point where the HARQ-ACK/NACK corresponding to the downlink time unit corresponding to the valid HARQ process is in the HARQ-ACK/NACK codebook.

The user equipment generates a HARQ-NACK according to a predefined rule with respect to an invalid HARQ process, and inserts the HARQ-NACK generated with respect to the invalid HARQ process into the HARQ-ACK/NACK codebook based on the start point where the HARQ-ACK/NACK corresponding to the downlink time unit corresponding to the invalid HARQ process is in the HARQ-ACK/NACK codebook.

When a number of bits of the HARQ-ACK/NACK corresponding to the valid HARQ process is greater than the minimum number of bits that may be occupied by the HARQ-ACK/NACK corresponding to each HARQ process, the user equipment enables the HARQ-ACK/NACK corresponding to the valid HARQ process to occupy a bit position of the HARQ-ACK/NACK corresponding to the next HARQ process. For example, in specific, a number of bits Z of the ACK/NACK of the HARQ process in which the PDSCH is received in the corresponding time unit (i.e., the valid HARQ process) may be greater than or equal to Y. At this time, the bits of the ACK/NACK corresponding to the HARQ process may occupy the bits of the ACK/NACK of the next HARQ process.

When a bit position of the HARQ-ACK/NACK corresponding to the invalid HARQ process is occupied by the HARQ-ACK/NACK corresponding to the valid HARQ process, the user equipment determines the number of bits of the HARQ-ACK/NACK corresponding to the invalid HARQ process as a difference between the number of bits that may be occupied by the HARQ-ACK/NACK corresponding to each HARQ process and an occupied number of bits of the HARQ-ACK/NACK corresponding to the valid HARQ process. For example, a number of bits Z' of the ACK/NACK of the HARQ process in which the PDSCH is not received in the corresponding time unit (i.e., the invalid HARQ process) is determined according to whether a bit position thereof is occupied by the ACK/NACK of the valid HARQ process. If the bit position thereof is not occupied by the ACK/NACK of the valid HARQ process, then Z'=Y. If the bit position thereof is occupied by the ACK/NACK of the valid HARQ process, and it is assumed that the occupied number of bits is Y1, then, Z'=Y−Y1. When Y=Y1, Z'=0.

Thus, according to the embodiment of the present disclosure, in order to avoid overlapping of the bits of the ACK/NACK of the valid HARQ process, the base station should avoid scheduling neighboring HARQ processes in which the ACK/NACKs are fed back in the same uplink time unit when performing a schedule.

According to another aspect of the second exemplary embodiment, the user equipment determines downlink time unit indexes of the respective downlink time units corresponding to the uplink time units based on the HARQ-ACK/NACK timing, wherein the downlink time unit indexes of the respective downlink time units corresponding to the uplink time units represent the order of the respective downlink time units corresponding to the uplink time units in the feedback window, respectively; and the user equipment determines bit positions where the HARQ-ACK/NACKs corresponding to respective downlink time units corresponding to the same uplink time unit are in the HARQ-ACK/NACK codebook, based on a sequence from greatest to least (the sequence of the HARQ-ACK/NACKs of the downlink time units is reverse to feedback timings indicated in the DCIs transmitted in the downlink time units) or a sequence from least to greatest (the sequence of the HARQ-ACK/NACKs of the downlink time units is same as the feedback timings indicated in the DCIs transmitted in the downlink time units) of the relative time sequence.

For example, 2 bits in the DCI indicate the HARQ-ACK/NACK timing (i.e., the time relationship between the PDSCH and the HARQ-ACK/NACK), it is assumed that the uplink time unit in which the HARQ-ACK/NACK of the PUCCH is feedback is m, for the downlink time unit m−(k0+3) to the downlink time unit m−(k0), it is possible to feed back the ACK/NACKs in the same uplink time unit m, for example, 2 bits in the DCI are 11, 10, 01, and 00, respectively. The base station may schedule one or more in the four downlink time units, also, 2 bits in the DCI may be any value when schedules the downlink time units. However, as long as the HARQ-ACK/NACK of at least one of the downlink time units falls in the uplink time unit m, the UE determines the size of the HARQ-ACK/NACK codebook according to the four downlink time units. Moreover, a position where the bits of the HARQ-ACK/NACK of the PDSCH is in the HARQ-ACK/NACK codebook is determined according to the relative time sequence of the downlink time unit in which the PDSCH is actually received in the four downlink time units.

For example, the size of the HARQ-ACK/NACK codebook of the PUCCH of the uplink time unit m is M*Z=4*2=8, that is, the size of the HARQ-ACK/NACK codebook is 8. According to the sequence from greatest to least of the HARQ-ACK/NACK feedback time indicated by the DCI, wherein first and second bits are the HARQ-ACK/NACK of the PDSCH of the time unit m−(k0+3), third and fourth bits are the HARQ-ACK/NACK of the PDSCH of the time unit m−(k0+2), and so on.

After the bit positions where the HARQ-ACK/NACKs corresponding to the respective downlink time units corresponding to the uplink time unit are in the HARQ-ACK/NACK codebook are determined according to the above method, the user equipment may generate the HARQ-ACK/NACK codebook according to a valid downlink time unit and an invalid downlink time unit, respectively. Wherein the valid downlink time unit indicates a downlink time unit in which the PDSCH is received and an uplink time unit of the HARQ-ACK/NACK corresponding to the PDSCH is the said uplink time unit. The invalid downlink time unit indicates a downlink time unit in which the PDSCH is not received or a downlink time unit in which the PDSCH is received but an uplink time unit of the HARQ-ACK/NACK corresponding to the PDSCH is not the said uplink time unit.

The HARQ-ACK/NACK is generated according to the received PDSCH with respect to the valid downlink time unit, and the HARQ-ACK/NACK generated with respect to the valid downlink time unit is inserted into the HARQ-ACK/NACK codebook based on the bit position where the HARQ-ACK/NACK corresponding to the valid downlink time unit is in the HARQ-ACK/NACK codebook.

The user equipment generates HARQ-NACK occupied bits according to the predefined rule with respect to the downlink time unit in which the PDSCH is not received.

The user equipment generates HARQ-NACK occupied bits according to the predefined rule with respect to the downlink time unit in which the PDSCH is received but an uplink time unit of the HARQ-ACK/NACK corresponding to the PDSCH is not the said uplink time unit.

Preferably, the user equipment generates HARQ-NACK occupied bits according to the predefined rule with respect to the downlink time unit in which the PDSCH is not received. However, the user equipment still generates HARQ-ACK/NACK according to the decoding result of the PDSCH, and inserts the generated HARQ-ACK/NACK into the HARQ-ACK/NACK codebook with respect to the downlink time unit in which the PDSCH is received but an uplink time unit of the HARQ-ACK/NACK corresponding to the PDSCH is not the said uplink time unit.

Figure 8:
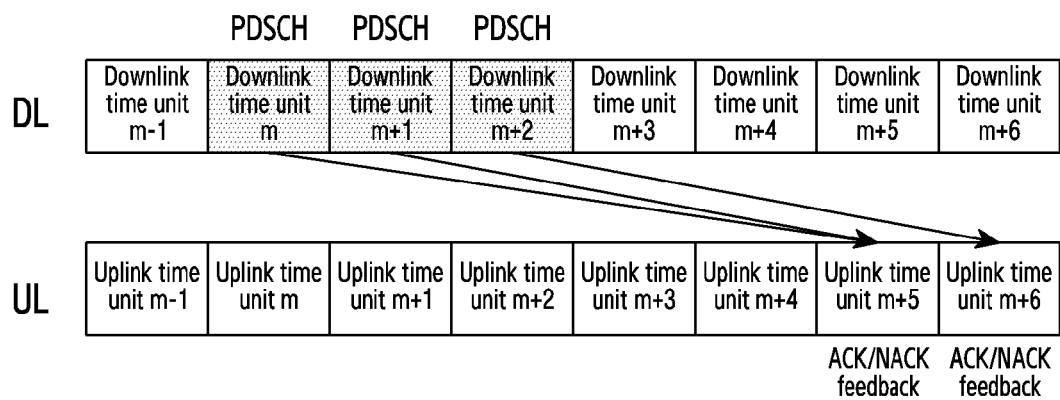
FIG. 8 is a diagram of uplink and downlink mapping based on a downlink time unit according to a second embodiment of the present disclosure.

For example, FIG. 8 is a diagram of uplink and downlink mapping based on a downlink time unit according to the second embodiment of the present disclosure.

Referring to FIG. 8, for example, 2 bits in the DCI indicate a timing difference between the PDSCH and the HARQ-ACK/NACK feedback, which may be 3, 4, 5 and 6. It is assumed that the number of bits of the HARQ-ACK/NACK fed back in each downlink time unit is Z=2, then, the size of the HARQ-ACK/NACK codebook is M*Z=8. 2-bits in the DCI in scheduled the downlink time unit m indicate 10, that is, the HARQ-ACK/NACK is fed back in the uplink time unit m+5, 2-bits in the DCI in scheduled the downlink time unit m+1 indicate 01, that is, the HARQ-ACK/NACK is fed back in the uplink time unit m+5, 2-bits in the DCI in scheduled the downlink time unit m+2 indicate 01, that is, the HARQ-ACK/NACK is fed back in the uplink time unit m+6. Then, as for the uplink time unit m+5, the first two bits of the ACK/NACK codebook correspond to the downlink time unit m−1, and 2-bits of HARQ-NACK is generated as reserved due to no scheduled data. As for the middle four bits of the HARQ-ACK/NACK codebook, HARQ-ACK/NACK bits are generated according to demodulation results of the PDSCHs of the downlink time units m and m+1, respectively, and as for the last two bits of the HARQ-ACK/NACK codebook, since the HARQ-ACK/NACK of the PDSCH of the downlink time unit m+2 is fed back in the uplink time unit m+6, 2-bits of HARQ-NACK is generated as reserved. As for the uplink time unit m+6, the first four bits of the HARQ-ACK/NACK codebook are NACKs, because the uplink time unit in which the HARQ-ACK/NACKs are fed back corresponding to the downlink time units m and m+1 is m+5.

According to another aspect of the second embodiment of the present disclosure, the control signaling may further include information indicating the relative time sequence of the currently scheduled downlink time unit in the feedback window corresponding to the uplink time unit. Thus, the user equipment may, based on information of the order of all the scheduled downlink time units corresponding to the uplink time unit in the feedback window corresponding to the uplink time unit, determine the bit positions where HARQ-ACK/NACKs corresponding to all the scheduled downlink time units are in the HARQ-ACK/NACK codebook, wherein the currently scheduled downlink time unit indicates a time unit in which the user equipment receives the PDSCH from the base station in the current downlink time unit.

Preferably, when the base station configures a carrier aggregation for a user terminal, if size of feedback window on each carrier is different, the size of the HARQ-ACK/NACK codebook is determined according to the multiplying of the largest length of respective feedback windows by a number of the configured serving cells. For example, the base station configures 2 serving cells for the user terminal, a size of the feedback window of one serving cell is 4, and a size of the feedback window of the other serving cell is 2, then, the size of the HARQ-ACK/NACK codebook is determined according to the multiplying of the size of the feedback window of each carrier (i.e., 4) by the number of the serving cells (i.e., 2) and by the number of bits of the HARQ-ACK of each downlink time unit. As for the serving cell of which the actual size of the feedback window is 2, a HARQ-ACK feedback of which the length is 4 is implemented by generating occupied bits.

Preferably, the control signaling may further include a first class DAI, wherein the first class DAI indicates one of the following information: relative time sequence of the currently scheduled downlink time unit in all the scheduled downlink time units corresponding to the same uplink time unit, and bit positions where HARQ-ACK/NACK bits of the currently scheduled downlink time unit are in the HARQ-ACK/NACK codebook. Thus, the user equipment may, based on values of the first class DAIs of all the scheduled downlink time units corresponding to the same uplink time unit, determine the bit positions where HARQ-ACK/NACKs corresponding to the respective downlink time units of all the scheduled downlink time units corresponding to the same uplink time unit are in the HARQ-ACK/NACK codebook.

Figure 9:
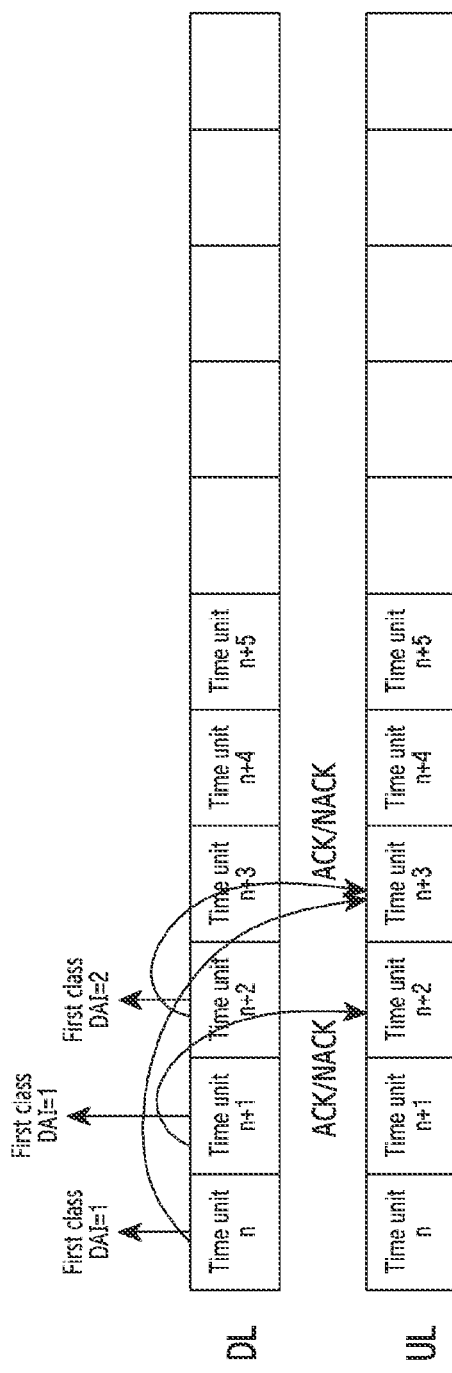
FIG. 9 is another diagram of uplink and downlink mapping based on the downlink time unit according to the second embodiment of the present disclosure.

For example, FIG. 9 is another diagram of uplink and downlink mapping based on the downlink time unit according to the second embodiment of the present disclosure.

Referring to FIG. 9, the bits indicating the HARQ-ACK/NACK feedback time in the DCI are 2 bits, which indicate that time differences between the HARQ-ACK/NACKs and the PDSCH are 1, 2, 3 and 4, respectively. It is assumed that the DCI of the PDSCH scheduling the downlink time unit n indicates that a time difference of HARQ-ACK/NACK feedback is 2, then the HARQ-ACK/NACK is fed back in n+3; the DCI of the PDSCH scheduling the downlink time unit n+1 indicates that a time difference of HARQ-ACK/NACK feedback is 1, then the HARQ-ACK/NACK is fed back in n+2; and the DCI of the PDSCH scheduling the downlink time unit n+2 indicates that a time difference of HARQ-ACK/NACK feedback is 1, the HARQ-ACK/NACK is fed back in n+3. Then, HARQ-ACK/NACKs of two downlink time units are fed back in the uplink time unit n+3, then first class DAIs indicated in the DCIs of the downlink time unit n and the downlink time unit n+2 are DAI=1 and DAI=2, respectively, while the first class DAI indicated in the DCI of the downlink time unit n+1 is DAI=1.

Preferably, in the control signaling, the first class DAI and the HARQ-ACK/NACK timing may be joint encoded.

When the indication value of the HARQ-ACK/NACK feedback time is a maximum value, for example, 2 bits indicate time differences of the HARQ-ACK/NACKs are 1 to 4, then, it is assumed that the DCI scheduling downlink time unit n indicates that the time difference of the HARQ-ACK/NACK is 4, the first class DAI must be 1, that is, the current downlink time unit must be a first downlink time unit of which the HARQ-ACK/NACK is fed back in the uplink time unit n+4, because downlink time units before the downlink time unit n are impossible to be mapped to the uplink time unit n+4. When the indicated time difference of the HARQ-ACK/NACK is 3, the first class DAI must be 1 or 2, that is, there are only two possibilities, one is that the current downlink time unit n is a first downlink time unit of which the HARQ-ACK/NACK is fed back in the uplink time unit n+2, and the other is that the downlink time unit n−1 is a first downlink time unit of which the HARQ-ACK/NACK is fed back in the uplink time unit n+3, and the downlink time unit n is a second downlink time unit of which the HARQ-ACK/NACK is fed back in the uplink time unit n+3. By that analogy, when the indicated time difference of the HARQ-ACK/NACK is 1, the first class DAI may be 1, 2, 3 or 4. Then, there are totally 10 kinds of combinations of the HARQ-ACK/NACK timing and the first class DAI, rather than 16 kinds. If 4-bit joint coding is adopted, the rest 6 states may be used for other functions.

In order to further compress bits, some of combinations of the first class DAI and the HARQ-ACK/NACK timing may be removed. For example, 3-bits may be used to jointly indicate the first class DAI and the HARQ-ACK/NACK feedback time. It is assumed that value ranges of HARQ-ACK/NACK feedback time delays are from 3 to 6, then Table 1 shows related relationship of joint encoding for the downlink time unit n.

TABLE 1

| 3-bits joint indication | Values of k in the uplink time unit n + k of the ARQ-ACK/NACK feedback time | First class DAI |
|---|---|---|
| 000 | 3 | 1 |
| 001 | 4 | 1 |
| 010 | 6 | 1 |
| 011 | 3 | 2 |
| 100 | 5 | 2 |
| 101 | 3 | 3 |
| 110 | 4 | 3 |
| 111 | 3 | 4 |

After the bit positions where the HARQ-ACK/NACKs corresponding to the respective downlink time units corresponding to the uplink time unit are in the HARQ-ACK/NACK codebook are determined according to the above method, the user equipment may insert the HARQ-ACK/NACKs corresponding to all the scheduled downlink time units in sequence from an initial bit position of the HARQ-ACK/NACK codebook, according to the order indicated by the first class DAIs of all the scheduled downlink time units corresponding to the uplink time unit, and insert occupied bits at the following bit positions.

In addition, when discontinuous first class DAIs are detected, the user equipment may determine that the PDSCH of the downlink time unit corresponding to the missing first class DAI is missed to be detected, generate HARQ-NACK with respect to the PDSCH that is missed to be detected, and insert the generated HARQ-NACK into a bit position corresponding to the relative time sequence indicated by the missing first class DAI in the HARQ-ACK/NACK codebook.

A third exemplary embodiment of the present disclosure will be described below.

According to one aspect of a third exemplary embodiment of the present disclosure, a size of a HARQ-ACK/NACK codebook generated by a user equipment is not fixed, which dynamically changed according to a number of downlink time units of scheduled PDSCHs of which the HARQ-ACK/NACKs needs to be fed back in uplink time unit.

Preferably, a control signaling may include a first class DAI, and the first class DAI is carried by DCI (Downlink Control Information). Here, the first class DAI indicates one of the following information: relative time sequence of the currently scheduled downlink time unit in all the scheduled downlink time units corresponding to the uplink time unit, and bit positions where HARQ-ACK/NACK bits of the currently scheduled downlink time units are in the HARQ-ACK/NACK codebook. It is assumed that a number of bits of the HARQ-ACK/NACK of each downlink time unit is $N_0$, according to a value $X_0$ of the first class DAI, it is determined that a start point where the bits of the HARQ-ACK/NACK of the downlink time unit are in the HARQ-ACK/NACK codebook is $(X_0*N_0-1)$th bit. For example, $N_0=2$. Then, when the first class DAI is equal to 1, the bits of the HARQ-ACK/NACK correspond to first and second bits in the HARQ-ACK/NACK codebook, by that analogy, when the first class DAI is equal to 4, the bits of the HARQ-ACK/NACK correspond to 7th and 8th bits in the HARQ-ACK/NACK codebook. Thus, the user equipment may also determine the size of the HARQ-ACK/NACK codebook based on the first class DAI. In specific, the user equipment determines a size of the HARQ-ACK/NACK codebook by a maximum value of the first class DAIs of all the scheduled downlink time units corresponding to the uplink time unit and the number of bits of the HARQ-ACK/NACK corresponding to each downlink time unit. After the size of the HARQ-ACK/NACK codebook is determined based on the above method, the user equipment may also determine the bit positions where the HARQ-ACK/NACKs corresponding to the respective downlink time units of all the scheduled downlink time units corresponding to the uplink time unit are in the HARQ-ACK/NACK codebook, based on values of the first class DAIs of the respective downlink time units in all the scheduled downlink time units corresponding to the uplink time unit.

Preferably, the first class DAI may also indicate a start point position where the bits of the HARQ-ACK/NACK corresponding to the currently scheduled PDSCH are in the HARQ-ACK/NACK codebook. For example, the value $X_0=5$ of the first class DAI of the scheduled second downlink time unit indicates that the start point position where the bits of the HARQ-ACK/NACK of the said downlink time unit are in the HARQ-ACK/NACK codebook is 5. That is, $X_0$ is calculated in consideration with $N_0$.

The advantage of this method is capable of supporting a situation that the numbers of bits of HARQ-ACK/NACKs of the respective downlink time units are not equal, that is, $N_0$ of each downlink time unit may be different.

For instance, a first downlink time unit corresponds to the HARQ-ACK/NACK fed back based on a Code Block group (CBG), $N_0=4$, while a second downlink time unit corresponds to the HARQ-ACK/NACK fed back based on a Transmission Block (TB), $N_0=1$. As described above, the value of the first class DAI of the second downlink time unit is $X_0=5$. That is, the counting of the first class DAI is counted in a unit of CBG, rather than according to PDCCH in the prior art. Similarly, when the UE is configured as an operating mode of a carrier aggregation, such a method may support a situation that $N_0$ of each downlink time unit/downlink carrier is different. Since a range of the maximum value of the first class DAI in the method is extended, more bits are needed. For instance, in comparison with 2-bits of first class DAI of the existing LTE, the first class DAI in the method needs 3 bits, or 4 bits.

If at least one serving carrier may support a transmission of two TBs, the first class DAI counted based on CBG may work by at least the following three methods: (1) when the first class DAI counts on one downlink time unit, it does not distinguish whether the downlink time unit is one or two TBs, but counts according to the total number of CBGs of all the TBs of the downlink time unit, then the number of bits of the fed back HARQ-ACK is identical to the first class DAI; (2) if the base station configures spatial bundling, when the first class DAI counts on one downlink time unit, it counts always according to the total number of CBGs of one TB, when two TBs are scheduled, it performs an AND operation on HARQ-ACKs of the two TBs. In the above example, it is assumed that for the first downlink time unit, the HARQ-ACK/NACK is fed back based on CBG, and two TBs are scheduled; for the second time unit, the HARQ-ACK/NACK is fed back based on TB, and one TB is scheduled, $N_0=1$. Then for the first downlink time unit, before bundling, the number of bits of HARQ-ACK of each TB is $N_0=4$, and after bundling, still $N_0=4$ bits are fed back. The value of the first DAI of the second downlink time unit $X_0=5$ still represents that the starting position of the HARQ-ACK/NACK bits of the downlink time unit in the HARQ-ACK/NACK codebook is 5; (3) if the base station does not configure spatial bundling, when the first class DAI counts on one downlink time unit, it counts according to the total number of CBGs of one TB, but the number of bits of the fed back HARQ-ACK is two times as big as the count. In the above example, it is assumed that for the first downlink time unit, the HARQ-ACK/NACK is fed back based on CBG, and two TBs are scheduled, for the second time unit, the HARQ-ACK/NACK is fed back based on TB, and one TB is scheduled, $N_0=1$. Then for the first downlink time unit, the number of bits of HARQ-ACK of each TB is $N_0=4$, $2*N_0$ bits are fed back in total. For the second downlink time unit, the number of bits of HARQ-ACK of the scheduled TB is $N_0=1$, and one bit of reserved bit is transmitted, then 2 bits are fed back in total. The value of the first DAI of the second downlink time unit $X_0=5$ represents the starting position of the HARQ-ACK/NACK bits of the downlink time unit in the HARQ-ACK/NACK codebook is $2*X_0-1$, and the total number of bits of the HARQ-ACK/NACK codebook is 10.

Preferably, the first class DAI determined by the above method may be used only for dynamic HARQ-ACK codebook for HARQ-ACK multiplexing of a plurality of carriers or for a plurality of time units, however, said first class DAI is not used for semi-static HARQ-ACK codebook for HARQ-ACK multiplexing of a plurality of carriers or for a plurality of time units, as embodiment 1 and 2. For example, a first class DAI which counts based on PDSCHs in the prior art may be used, or the DAI is not used for semi-static HARQ-ACK codebook. For example, semi-static HARQ-ACK codebook is based on DL association set determined by HARQ-ACK timing.

Preferably, in the control signaling, the first class DAI and HARQ-ACK/NACK timing may be joint encoded.

Preferably, the control signaling further includes a second class DAI, and the second class DAI is carried by DCI (Downlink Control Information). According to an exemplary embodiment, the second class DAI indicates a total number of all the scheduled downlink time units corresponding to the uplink time units. In this case, the user equipment may determine a size of the HARQ-ACK/NACK codebook by a value of the second class DAI and the number of bits of the HARQ-ACK/NACK corresponding to each downlink time unit. It is assumed that the number of bits of the HARQ-ACK/NACK of each downlink time unit is $N_0$, the value of the second class DAI is $Y_0$, then, the size of the HARQ-ACK/NACK codebook is $Y_0*N_0$. Hence, the size of the HARQ-ACK/NACK codebook is not fixed, but corresponds to the total number of downlink time units of all the scheduled downlink time units corresponding to the uplink time units.

Figure 10:
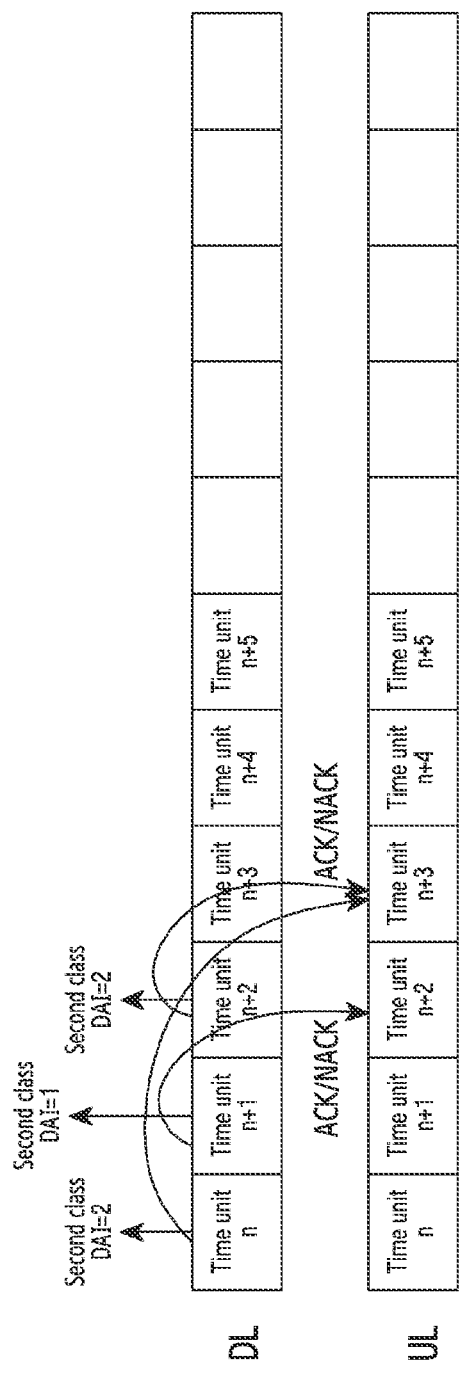
FIG. 10 is a diagram of uplink and downlink mapping based on a downlink time unit according to a third embodiment of the present disclosure.

For example, FIG. 10 is a diagram of uplink and downlink mapping based on a downlink time unit according to the third embodiment of the present disclosure.

Referring to FIG. 10, the bits in DCI indicating the HARQ-ACK/NACK feedback time are 2 bits, which indicate that time differences between the HARQ-ACK/NACK and the PDSCH are 1, 2, 3 and 4, respectively. It is assumed that the DCI of the PDSCH scheduling the downlink time unit n indicates that a time difference of the HARQ-ACK/NACK feedback is 3, then the HARQ-ACK/NACK is fed back in n+3; the DCI of the PDSCH scheduling the downlink time unit n+1 indicates that a time difference of the HARQ-ACK/NACK feedback is 1, then the HARQ-ACK/NACK is fed back in n+2; and the DCI of the PDSCH scheduling the downlink time unit n+2 indicates that a time difference of the HARQ-ACK/NACK feedback is 1, then the HARQ-ACK/NACK is fed back in n+3. Then, the HARQ-ACK/NACKs of two downlink time units are fed back in the uplink time unit n+3, then the second class DAI=2 is indicated in the DCI of the downlink time unit n and the time unit n+2 (it is assumed that 00 indicates DAI=1, that is, one downlink time unit, and 01 indicates DAI=2, that is, two time units), while the second class DAI=1 is indicated in the DCI of the downlink time unit n+1.

According to another exemplary embodiment, the second class DAI indicates a total number of downlink time units from the first downlink time unit to the current downlink time unit among all the scheduled downlink time units corresponding to the uplink time unit. In this case, the user equipment may determine the size of the HARQ-ACK/NACK codebook by a maximum value of the second class DAIs of all the scheduled downlink time units corresponding to the uplink time unit and the number of bits of the HARQ-ACK/NACK corresponding to each downlink time unit. Hence, the size of the HARQ-ACK/NACK codebook is not fixed, but corresponds to the total number of downlink time units of all the scheduled downlink time units corresponding to the uplink time unit. In such a case, when the user equipment only configures one serving cell, that is, when it does not operate in the carrier aggregation, the first class DAI and the second class DAI are the same. Only one DAI needs to be indicated in the DCI.

Figure 11:
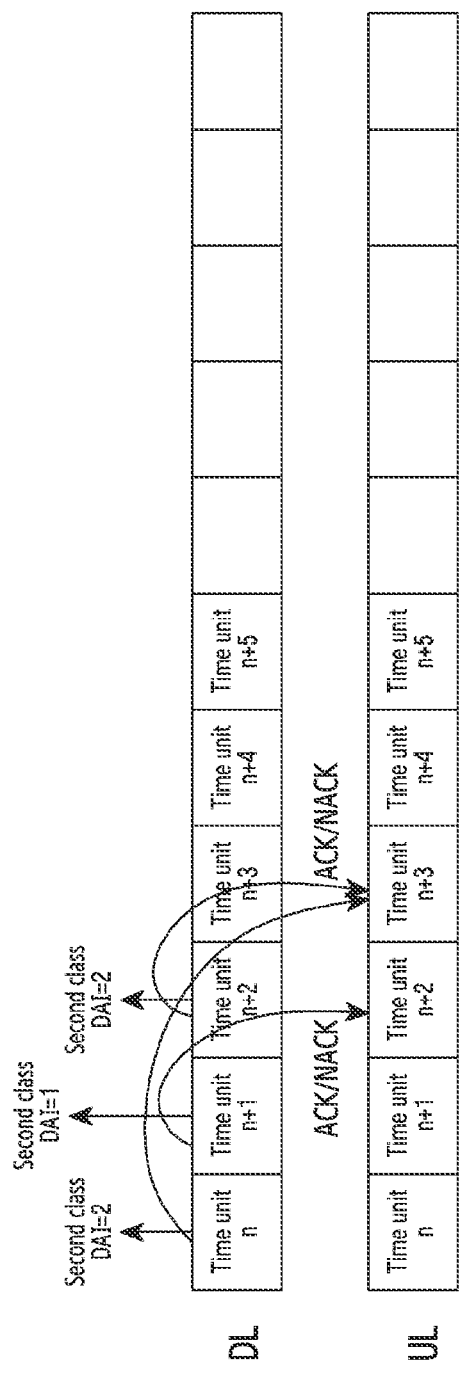
FIG. 11 is another diagram of uplink and downlink mapping based on the downlink time unit according to the third embodiment of the present disclosure.

For example, FIG. 11 is another diagram of uplink and downlink mapping based on the downlink time unit according to the third embodiment of the present disclosure.

Referring to FIG. 11, the bits in DCI indicating the HARQ-ACK/NACK feedback time are 2 bits, which indicate that time differences between the HARQ-ACK/NACK and the PDSCH are 1, 2, 3 and 4, respectively. It is assumed that the DCI of the PDSCH scheduling the downlink time unit n indicates that a time difference of the HARQ-ACK/NACK feedback is 3, then the HARQ-ACK/NACK is fed back in n+3; the DCI of the PDSCH scheduling the downlink time unit n+1 indicates that a time difference of the HARQ-ACK/NACK feedback is 1, the HARQ-ACK/NACK is fed back in n+2; and the DCI of the PDSCH scheduling the downlink time unit n+2 indicates that a time difference of the HARQ-ACK/NACK feedback is 1, the HARQ-ACK/NACK is fed back in n+3. Then, the HARQ-ACK/NACKs of two downlink time units are fed back in the uplink time unit n+3, then the second class DAI=2 is indicated in the DCI of the downlink time unit n (it is assumed that 00 indicates DAI=1, that is, one downlink time unit, and 01 indicates DAI=2, that is, two time units), the second class DAI=1 is indicated in the DCI of the downlink time unit n+1, and the second class DAI=2 is indicated in the DCI of the downlink time unit n+2.

According to another exemplary embodiment, the second class DAI may indicate the total number of bits of the HARQ-ACK/NACK codebook. That is, the value $Y_0$ of the second class DAI is calculated in consideration with $N_0$, and may support the situation that $N_0$s of different downlink time units/downlink carriers are not equal, that is, it is counted in unit of CBG. In this case, the user equipment may determine the size of the HARQ-ACK/NACK codebook based on the number of bits indicated by the second class DAI.

Preferably, in the control signaling, the first class DAI, the second class DAI and the HARQ-ACK/NACK timing may be joint encoded.

For example, 5-bits may be used to jointly indicate the first class DAI, the second class DAI, and the HARQ-ACK/NACK feedback time. 1 bit may be saved in comparison with using 2 bits to indicate the first class DAI, 2-bits to indicate the second class DAI, and 2-bits to indicate the HARQ-ACK/NACK feedback time, respectively. Thus, Table 2 shows relationships of joint encoding information for the downlink time unit n.

TABLE 2

| 5-bit joint indication | Values of k in the uplink time unit n + k of the HARQ-ACK/NACK feedback time | First class DAI | Second class DAI |
|---|---|---|---|
| 00000 | 6 | 1 | 1 |
| 00001 | 6 | 1 | 2 |
| 00010 | 6 | 1 | 3 |
| 00011 | 6 | 1 | 4 |
| 00100 | 5 | 1 | 1 |
| 00101 | 5 | 1 | 2 |
| 00110 | 5 | 1 | 3 |
| 00111 | 5 | 2 | 2 |
| 01000 | 5 | 2 | 3 |
| 01001 | 5 | 2 | 4 |
| 01010 | 4 | 1 | 1 |
| 01011 | 4 | 1 | 2 |
| 01100 | 4 | 2 | 2 |
| 01101 | 4 | 2 | 3 |
| 01110 | 4 | 3 | 3 |
| 01111 | 4 | 3 | 4 |
| 10000 | 3 | 1 | 1 |
| 10001 | 3 | 2 | 2 |
| 10010 | 3 | 3 | 3 |
| 10011 | 3 | 4 | 4 |

Figure 12:
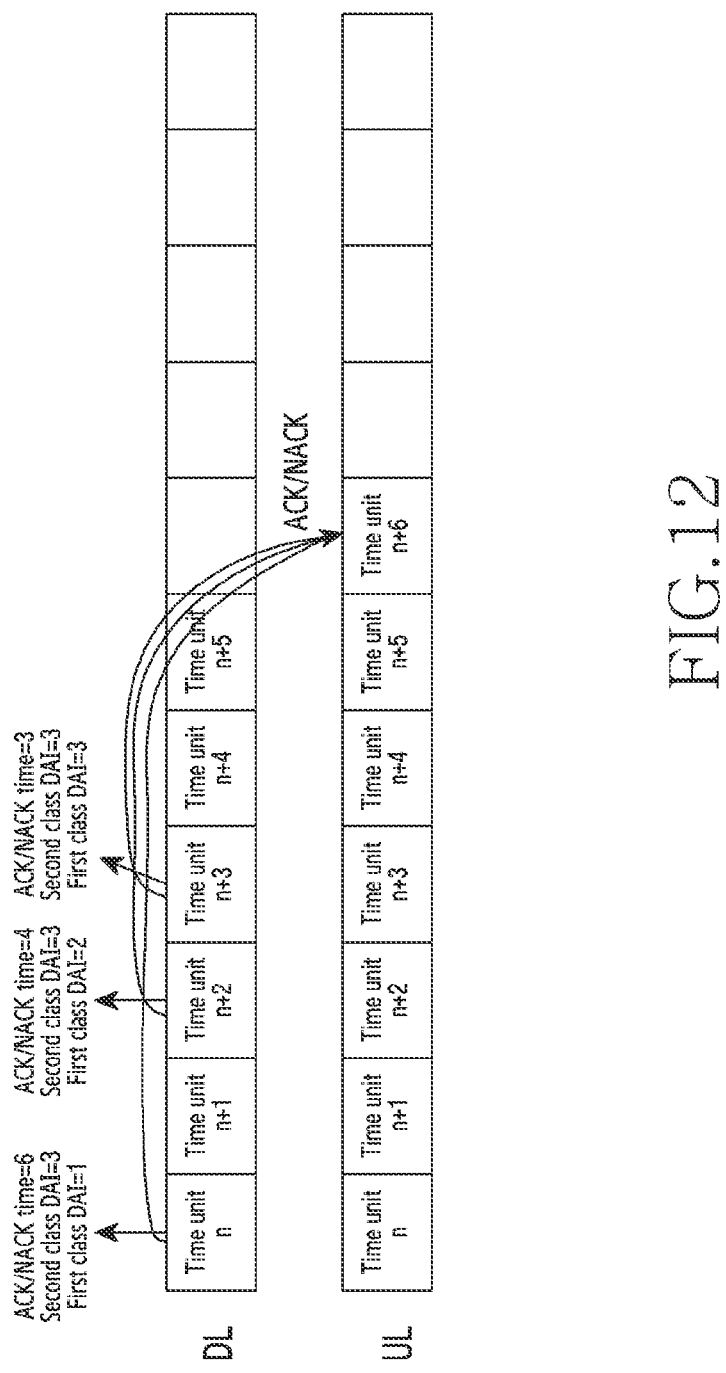
FIG. 12 is another diagram of uplink and downlink mapping based on the downlink time unit according to the third embodiment of the present disclosure.

For example, FIG. 12 is another diagram of uplink and downlink mapping based on the downlink time unit according to the third embodiment of the present disclosure.

Referring to FIG. 12, it is assumed that the HARQ-ACK/NACK timing range that may be indicated in the DCI is from 3 to 6, the maximum total number of the downlink time units corresponding to the HARQ-ACK/NACK feedback in the same uplink time unit is 4. Then, according to 5-bit joint coding in Table 2, as for the downlink time unit n, the 5-bits indicate 00010, that is, the HARQ-ACK/NACK is fed back in an uplink time unit n+6, the downlink time unit n is a first downlink time unit of which the HARQ-ACK/NACK is fed back in the uplink time unit n+6, that is, the first class DAI=1, and the total number of the downlink time units of which the HARQ-ACK/NACKs are fed back in the uplink time unit n+6 is 3, that is, the second class DAI=3. As for the downlink time unit n+2, 5-bits indicate 01101, that is, the HARQ-ACK/NACK is fed back in the uplink time unit n+6, the downlink time unit n+2 is a second downlink time unit of which the HARQ-ACK/NACK is fed back in the uplink time unit n+6, that is, the first class DAI=2, and the total number of the downlink time units of which the HARQ-ACK/NACKs are fed back in the uplink time unit n+6 is 3, that is, the second class DAI=3. As for the downlink time unit n+3, 5-bits indicate 10010, that is, the HARQ-ACK/NACK is fed back in the uplink time unit n+6, the downlink time unit n+3 is a third downlink time unit of which the HARQ-ACK/NACK is fed back in the uplink time unit n+6, that is, the first class DAI=3, and the total number of the downlink time units of which the HARQ-ACK/NACKs are fed back in the uplink time unit n+6 is 3, that is, the second class DAI=3.

Figure 13:
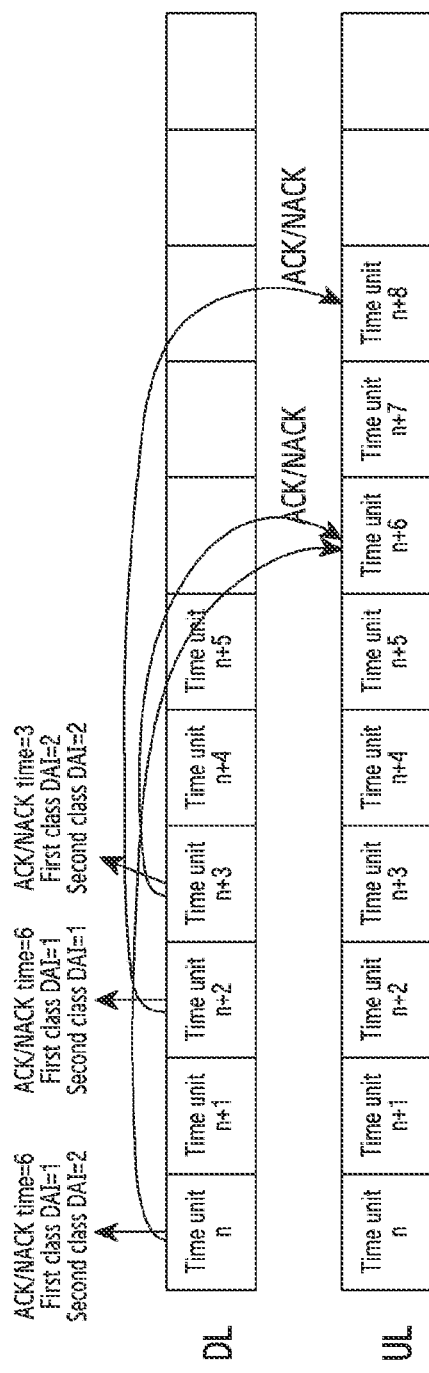
FIG. 13 is another diagram of uplink and downlink mapping based on the downlink time unit according to the third embodiment of the present disclosure.

For another example, FIG. 13 is another diagram of uplink and downlink mapping based on the downlink time unit according to the third embodiment of the present disclosure.

Referring to FIG. 13, it is assumed that the HARQ-ACK/NACK timing range that may be indicated in the DCI is from 3 to 6, the maximum total number of the downlink time units corresponding to the HARQ-ACK/NACK feedbacks in the same uplink time unit is 4. Then, according to 5-bit joint encoding in Table 2, as for the downlink time unit n, 5-bit indicate 00001, that is, the HARQ-ACK/NACK is fed back in an uplink time unit n+6, the downlink time unit n is the first downlink time unit of which the HARQ-ACK/NACK is fed back in the uplink time unit n+6, that is, the first class DAI=1, and the total number of the downlink time units of which the HARQ-ACK/NACKs are fed back in the uplink time unit n+6 is 2, that is, the second class DAI=2. As for the downlink time unit n+2, 5-bits indicate 00000, that is, the HARQ-ACK/NACK is fed back in the uplink time unit n+8, the downlink time unit n+2 is the first downlink time unit of which the HARQ-ACK/NACK is fed back in the uplink time unit n+8, that is, the first class DAI=1, and the total number of the downlink time units of which the HARQ-ACK/NACKs are fed back in the uplink time unit n+8 is 1, that is, the second class DAI=1. As for the downlink time unit n+3, 5-bits indicate 10001, that is, the HARQ-ACK/NACK is fed back in the uplink time unit n+6, the downlink time unit n+2 is the second downlink time unit of which the HARQ-ACK/NACK is fed back in the uplink time unit n+6, that is, the first class DAI=2, and the total number of the downlink time units of which the HARQ-ACK/NACKs are fed back in the uplink time unit n+6 is 2, that is, the second class DAI is equal to 2.

It is worthy of noting that, the numbers of bits of the first class DAI and/or the second class DAI are limited, for example, 2-bits, but which may denote values greater than 4 through a manner of taking a Modulo Operation. For example, when M indicating number of the downlink time units of which the HARQ-ACK/NACKs are fed back in the same uplink time unit is greater than the range indicated by the bits of the DAI, the value of the corresponding DAI in the table of the present embodiment is M mod M_dai. For example, M=8, but the DAI is only 2-bits, then, DAI=3 in the table may denote 3 and 7.

Preferably, in the control signaling, a third class DAI may be included, and the content indicated by the third class DAI is the same as the content indicated by the second class DAI, or the third class DAI indicates the total number of bits of the received HARQ-ACK/NACK codebook expected by the base station and the total number of bits of the HARQ-ACK/NACK corresponding to the PDSCH actually scheduled by the base station is equal to or smaller than the expected total number of bits. For example, in the control signal DCI transmitted by scheduling the uplink, a third class DAI is included, and in the control signal DCI transmitted by scheduling the downlink, a first class DAI and a second class DAI are included. When a HARQ-ACK is transmitted on PUSCH, if the PUSCH needs to perform rate matching according to the HARQ-ACK codebook, the size of the HARQ-ACK codebook is indicated by the third class DAI. In order to make sure that the UE has enough time to perform rate matching, it may be stipulated that for the PDSCHs of which the HARQ-ACKs are transmitted on one same PUSCH, the said PUSCH is scheduled, and a DCI containing the first class DAI and the second class DAI cannot be later than the DCI which schedules the said PUSCH and the DCI containing the third class DAI, or it may be stipulated that a time difference between the DCI containing the first class DAI and the second class DAI and the said PUSCH cannot be smaller than a predefined value, or it may be stipulated that a time difference between the DCI containing the first class DAI and the second class DAI and the DCI containing the third class DAI cannot be smaller than a predefined value, or a time difference between the DCI containing the first class DAI and the second class DAI and the DCI containing the third class DAI is not defined, but the base station needs to ensure that the size of the HARQ-ACK codebook indicated by the second class DAI does not exceed the size of the HARQ-ACK codebook indicated by the third class DAI.

In addition, the above solutions are all described by taking that the kinds of the HARQ-ACK/NACK timing M=the maximum number $M_1$ of the downlink time units of which the HARQ-ACK/NACKs are fed back in the same uplink time unit as an example. However, the above described solutions of joint coding are all suitable for the situation that the kinds of the HARQ-ACK/NACK timing M>the maximum number $M_1$ of the downlink time units of which the HARQ-ACK/NACKs are fed back in the same uplink time unit.

According to another aspect of the present disclosure, when the HARQ-ACK/NACK codebook is generated, when the total number of bits of uplink control signaling including at least the HARQ-ACK/NACKs, which need to be fed back in the uplink time unit, exceeds a maximum number of bits of uplink control signaling that may be carried by a PUCCH resource configured by the base station, the user equipment may compress the bits of the HARQ-ACK/NACKs that need to be fed back in the uplink time unit according to the predefined rule. Here, the maximum number of bits of the HARQ-ACK/NACKs that may be carried by the PUCCH resource configured by the base station is predefined by the specification, or is determined through the physical resource occupied by the PUCCH and the predefined coding rate, or is determined through formats of the PUCCH. One implementing method is to bundle the HARQ-ACK/NACK feedback of the CB/CBG as the HARQ-ACK/NACK of the TB. It is assumed that each TB may be divided in to Ncb CBGs at most, then, when the total number of the HARQ-ACK/NACKs that needs to be fed back exceeds the maximum number of bits of the HARQ-ACK/NACK that may be carried by the PUCCH resource configured by the base station, if the scheduled Ncb' CBGs are all decoded correctly (wherein Ncb' is smaller than or equal to Ncb), it is deemed that the whole TB is transmitted correctly, and 1-bit of ACK is generated, and if at least one of Ncb' CB groups is not decoded correctly, it is deemed that the whole TB is transmitted wrongly, and 1-bit of HARQ-NACK is generated.

According to another aspect of the present disclosure, when the HARQ-ACK/NACK codebook is generated, when the total number of bits of uplink control signaling including at least the HARQ-ACK/NACKs, which need to be fed back in the uplink time unit, exceeds a maximum number of bits of uplink control signaling that may be carried by PUCCH resource configured by the base station, next greater PUCCH resource that may carry the total number of bits of uplink control signalings that need to be fed back is used to transmit the uplink control signalings in the uplink time unit. For example, the base station semi-statically configures four PUCCH resources for the user equipment, the maximum numbers of bits of the ACK/NACKs which may be carried by the four PUCCH resources are Na1, Na1, Na2, and Na2, respectively. The base station indicates the user equipment to adopt the second PUCCH resource, but if the user equipment finds that the total number of the ACK/NACKs that need to be fed back exceeds Na1 rather than exceeding Na2, then the user equipment adopts the third PUCCH resource.

According to another aspect of the present disclosure, when the HARQ-ACK/NACK codebook is generated, when the total number of bits of uplink control signaling including at least the HARQ-ACK/NACKs, which need to be fed back in the uplink time unit, exceeds a maximum number of bits of uplink control signaling that may be carried by PUCCH resources configured by the base station, the user equipment receives downlink scheduling information indicating new PUCCH resource that may carry the total number of bits of the uplink control signaling which needs to be fed back from the base station, in the current downlink time unit or at least the last downlink time unit corresponding to the uplink time unit, and uses the new PUCCH resource to transmit the uplink control signaling in the uplink time unit. For example, the base station semi-statically configures four PUCCH resources for the user equipment, the maximum numbers of bits of the HARQ-ACK/NACKs which may be carried by the four PUCCH resources are Na1, Na1, Na2, and Na2, respectively. In first and second downlink time units, the base station indicates the user equipment to adopt the second PUCCH resource, but in the third downlink time unit, the base station indicate the user equipment to adopt the third PUCCH resource, then the user equipment adopts the third PUCCH resource.

According to another aspect of the present disclosure, when the HARQ-ACK/NACK codebook is generated, when the total number of bits of HARQ-uplink control signaling which needs to be fed back in the uplink time unit, exceeds a maximum number of bits of uplink control signaling that may be carried by PUCCH resources configured by the base station, the user equipment abandons to transmit the HARQ-ACK/NACK of the downlink time unit having a low priority, so that the total number of bits of the uplink control signaling transmitted does not exceed the maximum number of bits of the uplink control signaling that may be carried by the PUCCH resources configured by the base station. For example, when there are different service types, a priority of the PDSCH of eMBB (Enhance Mobile Broadband) is lower than a priority of the PDSCH of URLLC (Ultra-Reliable Low latency Communications). Or, a priority of the PDSCH scheduled according to a first class DCI format is lower than a priority of the PDSCH scheduled according to a second class DCI format. Preferably, the control signaling may also include other uplink control signalings, such as channel state information and so on.

It is worthy of noting that, in the above embodiment, when a HARQ-ACK/NACK fed back in one uplink time unit is only from one downlink time unit, one implementing method is to determine a HARQ-ACK/NACK codebook and HARQ-ACK/NACK bit mapping according to the method of the above embodiment as well. Another implementing method is to generate a codebook only according to the HARQ-ACK/NACK in one downlink time unit. When the codebook is generated according to the HARQ-ACK/NACK in one downlink time unit, the HARQ-ACK/NACK codebook may be determined according to the number of the actually scheduled CB/CBGs. For example, the PDSCH transmitted in one downlink time unit may have N CBGs at most, the maximum bits of the HARQ-ACK/NACK feedback are N-bits. When only HARQ-ACK/NACK in one downlink time unit is fed back in one uplink time unit, a user terminal feeds back k bits of HARQ-ACK/NACK, wherein k is the number of the actually scheduled CB groups, and k≤N. However, when HARQ-ACK/NACKs of a plurality of downlink time units are fed back in one uplink time unit, the user terminal determines the number of bits of the HARQ-ACK/NACK feedback of each downlink time unit according to N.

According to another aspect of the present disclosure, when the HARQ-ACK/NACK codebook is generated, and for respective downlink time units and/or downlink carriers that need the HARQ-ACK/NACK feedbacks, same number of bits of the HARQ-ACK/NACKs may be adopted to be fed back by configuration of the base station. For example, the respective downlink time units and/or downlink carriers of which the HARQ-ACK/NACKs are fed back in the same uplink time unit may adopt different HARQ-ACK/NACK feedback manners, some of the downlink time units and/or downlink carriers adopt the HARQ-ACK/NACK feedback based on CBGs, and the number of bits of the HARQ-ACK/NACK of each downlink time unit and/or downlink carrier is N1, while other downlink time units and/or downlink carriers adopt the HARQ-ACK/NACK feedback based on the TB, and the number of bits of the HARQ-ACK/NACK of each downlink time unit and/or downlink carrier is N2. The base station may configure that the UE feeds back the HARQ-ACK/NACKs according to a same length for all the downlink time units and/or downlink carriers, for example, the UE feeds back the HARQ-ACK/NACK according to the number of bits being N1 or N2 for each downlink time unit and/or downlink carrier. For example, if the base station configures the feedbacks are performed according to the number of bits being N2, an AND operation is performed on HARQ-ACK/NACKs of a plurality of CBGs of one TB to obtain one HARQ-ACK/NACK of the one TB, so that compressing N1-bits are compressed to N2-bits. For another example, if the base station configures the feedbacks are performed according to the number of bits being N1, the N2-bits may be mapped to the first N2-bits of the N1-bits, and the bits may be filled in the rest of N1-N2 bits of the N1-bits to occupy bits, so that N2-bits may be expanded to N1-bits. In this embodiment, if the second class DAI indicates the total number of the downlink time units and/or downlink carriers of which the HARQ-ACK/NACKs need to be fed back, the total number of bits of the HARQ-ACK/NACK codebook is the second class DAI*N1 or the second class DAI*N2. When at least one carrier is configured to be in a work mode which may support a plurality of TBs, the base station may configure spatial bundling on the respective carriers according to the existing technology, that is, when there are two TBs which need to feedback HARQ-ACKs in one downlink carrier, an AND operation is performed on the HARQ-ACKs of the two TBs. Here, the AND operation is performed on the HARQ-ACKs of N1 or N2 bits of the two TBs, so that the number of bits of the HARQ-ACK of each downlink carrier is N1 or N2, which makes the total number of bits of the HARQ-ACK/NACK codebook to be the second class DAI*N1 or the second class DAI*N2. Or, the base station configures such that the feedback of HARQ-ACK is performed according to two TBs for the respective carriers, then in our embodiment, the bit number of HARQ-ACK/NACK feedback of each downlink time unit/downlink carrier is N1 or N2, which means that the total number of bits of the two TBs is N1 or N2, that is, the total number of bits of each TB is N1/2 or N2/2, and the base station may configure N1 or N2 though signaling, and also may configure N1/2 or N2/2 though signaling, both signaling could be different in their forms, but having the same effect.

According to another aspect of the present disclosure, in generating the HARQ-ACK/NACK codebook, when the base station schedules only one PDSCH or schedules only one PDSCH which stratifies predefined conditions (for example, there is only one scheduled PDSCH and the PDSCH is on Pcell and/or the first class DAI of the scheduled PDSCH is 1), if the number of CBGs determined by the size of the TB of the PDSCH is smaller than the max value N of CBGs configured by the base station, the user terminal only feedbacks c bits or 2*c bits HARQ-ACK/NACK, and when the number of HARQ-ACK/NACK bits and/or the number of HARQ-ACK/NACK bits and SR are equal to or smaller than the predefined threshold, for example, the threshold=2, the user terminal will use a PUCCH format supporting no more than 2 bits HARQ-ACK/NACK to transmit the HARQ-ACK/NACK, for example, like the PUCCH format 1a/1b in LTE system.

In the above embodiment, the user terminal may operate in a fallback mode by the scheduling of the base station, which may ensure consistent understandings on the HARQ-ACK/NACK codebook by the base station and the user terminal, for example, when it is not determined that whether the understandings on some configurations (for example, the configuration of HARQ-ACK/NACK feedback) by the user terminal and the base station are consistent, or when the base station does not configure HARQ-ACK/NACK feedback related information for the user. For example, before the base station transmits a higher-layer control signaling for HARQ-ACK/NACK codebook determination, or before the base station determines that the user terminal has correctly received the higher-layer control signaling for HARQ-ACK/NACK codebook determination, the user terminal may operate in a fallback mode by the scheduling of the base station. For example, in the first exemplary embodiment, when the base station does not semi-statically configure the size of the HARQ-ACK/NACK codebook, the base station may schedule only one downlink time unit to fed back HARQ-ACK/NACK in one uplink time unit, and the user terminal performs a feedback according to the HARQ-ACK/NACK of one time unit without HARQ-ACK multiplexing. For another example, in the third embodiment, before the base station determines that the user terminal has correctly received the higher-layer control signaling configuring the HARQ-ACK/NACK codebook based on CBG, the base station may schedule only one downlink time unit of one carrier PDSCH to fed back HARQ-ACK in one uplink time unit by fallback DCI (Downlink control information), that is, the PDSCH scheduled by the fallback DCI and the HARQ-ACK/NACK feedback of the PDSCH are TB-based transmission and TB-based HARQ-ACK/NACK feedback. By this way, the user terminal may only feed back $N_2$ bits of the HARQ-ACK/NACK, for example, $N_2=1$, and the user terminal may use the PUCCH format supporting a smaller overhead to transmit the HARQ-ACK/NACK, for example, like the PUCCH format 1a/1b in LTE system. The advantage of this method is that when the base station reconfigures CBG-based scheduling/feedback or reconfigures HARQ-ACK/NACK feedback bits $N_1$ of CBG-based scheduling/feedback, even though the user may not be sure of the downlink control signaling or the overhead of the PUCCH, the user can rely on fallback DCI and determines the payload of HARQ-ACK/NACK codebook on PUCCH.

In other cases, for example, the HARQ-ACK/NACKs of more than one PDSCHs needs feedbacks and it is configured with a semi-static HARQ-ACK/NACK codebook, the user terminal will determine the HARQ-ACK/NACK codebook according to configured number of CBGs N and number of PDSCHs.

According to another aspect of the present disclosure, in generating the HARQ-ACK/NACK codebook, if there is a same TB corresponding to at least two PDSCHs in the same HARQ-ACK/NACK codebook, when the user terminal generates the HARQ-ACK/NACK codebook, the user terminal may determine the value of HARQ-ACK/NACK according one of the following two methods:

Method A: with respect to the same TB, the user terminal generates HARQ-ACK/NACK bits using HARQ-ACK/NACK of a last received PDSCH according to a decoding result of the PDSCH, and sets HARQ-ACK/NACK bit values of all CBGs of the preceding PDSCH (or PDSCHs) to a predefined value, for example, the predefined value is set as NACK.

The above described case will appear when the base station finds that a part of resources transmitted by the previous PDSCH are preempted, and then retransmitted a part of CBGs of the same PDSCH timely, and the HARQ-ACK/NACKs transmitted for the two times are on a same PUCCH. Since the HARQ-ACK/NACK result generated with respect to the transmission of the second PDSCH by the user terminal is valid, and the HARQ-ACK/NACK information of the previous PDSCH is redundant, thus all the HARQ-ACK/NACK bits transmitted by the previous PDSCH is set to be NACK, which may save the power of PUCCH. In addition, this method enables the base station to identify, when all the HARQ-ACK/NACKs of the last one PDSCH are NACKs, whether the user terminal miss-detects the last one PDSCH or finds that the case that CRC checking of all the CBGs is correct but CRC checking of the TBs is failed occurs when receiving and demodulating the last one PDSCH. That is, if the user terminal miss-detects the last one PDSCH, the user terminal will generate HARQ-ACK/NACK values according actual demodulation results with respect to the previous received PDSCH, and the HARQ-ACK/NACKs of the next PDSCH position are all NACKs; and if the case that CRC checking of all the coding blocks is correct but CRC checking of the TB s is failed occurs, the user terminal will set the HARQ-ACK/NACKs of all the PDSCHs to be NACKs.

Accordingly, at base station side, a preferable embodiment is to perform an OR operation on the HARQ-ACK/NACK bits of the two PDSCHs according to CBG one by one, that is, the OR operation is performed on the bits of the two HARQ-ACK/NACKs having the same CBG index, as long as one of the two HARQ-ACK/NACKs is ACK, which means this CBG is received correctly. Of course, when the base station finds that the HARQ-ACK of the previous PDSCH is not all the NACKs and there is at least one ACK in the latter PDSCH, the base station may decide an error may occurs in the demodulation of the HARQ-ACK/NACKs. The base station may perform corresponding process, for example, may reschedule the CBG of which the demodulation of the HARQ-ACK/NACKs occurs an error.

For the convenience of explanation, an example of a single carrier is provided. As shown in FIG. 17, carrier 1 is configured as HARQ-ACK/NACK feedback based on the CBG, N1=4. It is assumed that the scheduled PDSCHs shown in the FIG. 17 each corresponds to one same PUCCH feedback HARQ-ACK. The base station schedules the retransmission of the TB0 in the time unit #0, and schedules the initial transmission of the transmission block TB1 in the time unit #1, wherein the third CBG is preempted by URLLC, and thus the base station schedules the retransmission of the third CBG of the transmission block TB1 in the time unit #3, and schedules the initial transmission of the transmission block TB2 in the time unit #2. It is assumed that the feedback method is to feedback according to the configured max number of CBGs, that is, N1=4. It is assumed that the user terminal successfully detects PDCCHs of the PDSCH scheduled in the above 4 time units, then finally the order at which the user terminal feedbacks the HARQ-ACKs is: 4 bits of TB0 of the time unit #0, 4 bits of TB1 of the time unit #1, 4 bits of TB2 of the time unit #2, and 4 bits of TB1 of the time unit #3. It is assumed that the user terminal demodulates TB0 and TB2 correctly, demodulates the second and the fourth CBGs of TB1 of the time unit #1 correctly, and demodulates the third CBG correctly after receiving TB1 of the time unit #3. The fed back HARQ-ACK/NACK bits are AAAANANAAAANAAA according to the existing technology. However, according to the method of the present disclosure, the fed back HARQ-ACK/NACK bits are AAAANNNNAAAANAAA, that is, although the second and the fourth CBGs of TB1 of the time unit #1 is demodulated correctly, it still feedback NACKs, because the feedback of the time unit #3 has implemented correct demodulation of the second and the fourth CBGs and the third CBGs. If the user terminal does not detect the PDCCH of the time unit #3, the user terminal should generates HARQ-ACK/NACK bits according to the demodulation result when feeding back ACK/NACK of TB1 of the time unit #1, that is, the total fed back HARQ-ACK/NACK bits are AAAANANAAAAANNNN. The base station may determine whether the user station demodulate corresponding CBGs correctly by performing an OR operation bit-by-bit on the plurality of the HARQ-ACK/NACK of one same TB. For example, in the following example, an OR operation on NANA of the time unit #1 and NNNN of the time unit #3 is performed bit-by-bit, and the result is NANA. For another example, it is assumed that the user terminal demodulates TB0 and TB2 correctly, demodulates the first, second, and fourth CBGs of TB1 of the time unit #1, and also demodulates the third CBG correctly after receiving TB1 of the time unit #3. But the user terminal finds that error occurs in the CRC of the TB, then the fed back HARQ-ACK/NACK is AAAANNNNAAAANNNN.

Method B: with respect to the same TB, the user terminal sets the HARQ-ACK/NACK values of all the received PDSCHs to be a same value which is generated according to a demodulation result of a PDSCH received last time. If the user terminal received a plurality of PDSCHs and found that the CRC checking of all the coding blocks is correct but the CRC checking of the TBs is not correct, the user terminal will set the HARQ-ACK/NACKs of all the PDSCHs to be NACKs. If the user terminal does not find an error in the CRC checking of the TBs, the user terminal generates HARQ-ACK/NACK according to the demodulation results of the last received PDSCH, and also sets the HARQ-ACK/NACKs of the previous received PDSCHs to be same with the values of HARQ-ACK/

NACK of the last received PDSCH. Of course, if the user terminal does not detect a part of PDSCHs, but the user finds a miss-detection of the PDSCH, an NACK is generated.

The advantage of this method is that if the physical layer or the MAC layer only could reserve the HARQ-ACK information demodulated at the last time for one same TB, then it is possible to set the HARQ-ACK result demodulated at last time to be the HARQ-ACK bit position of the previous PDSCH. Of course, it is possible that the physical layer may reserve the HARQ-ACK information of PDSCHs more than once for one same TB, however, setting the HARQ-ACKs of the one same TB transmitted in one same PUCCH or PUSCH to be a same value may improve the probability of correctly receiving the HARQ-ACKs by the base station.

As shown in FIG. 18, carrier 1 is configured as HARQ-ACK/NACK feedback based on the CBG, N1=4. It is assumed that the scheduled PDSCHs shown in the FIG. 18 each corresponds to one same PUCCH feedback HARQ-ACK. The base station schedules the retransmission of the transmission block TB0 in the time unit #0, and schedules the initial transmission of the transmission block TB1 in the time unit #1, wherein the third CBG is preempted by URLLC, and thus the base station schedules the retransmission of the third CBG of the transmission block TB1 in the time unit #3, and schedules the initial transmission of the transmission block TB2 in the time unit #2. It is assumed that the feedback method is to feedback according to the configured max number of coding units, that is, N1=4. It is assumed that the user terminal successfully detects PDCCHs of the PDSCH scheduled in the above 4 time units, then finally the order at which the user terminal feedbacks the HARQ-ACKs is: 4 bits of TB0 of the time unit #0, 4 bits of TB1 of the time unit #1, 4 bits of TB2 of the time unit #2, and 4 bits of TB1 of the time unit #3. It is assumed that the user terminal demodulates TB0 and TB2 correctly, demodulates the second and the fourth CBGs of TB1 of the time unit #1 correctly, and demodulates the third CBG correctly after receiving TB1 of the time unit #3. According to the method of the present disclosure, the fed back HARQ-ACK/NACK bits are AAAANAAAAAAANAAA, that is, the HARQ-ACK corresponding to TB1 of the time unit #1 is fed back according to the HARQ-ACK of the time unit #3. If the user terminal does not detect the PDCCH of the time unit #3, the user terminal should generates HARQ-ACK/NACK bits according to the demodulation result when feeding back ACK/NACK of TB1 of the time unit #1, that is, the total fed back HARQ-ACK/NACK bits are AAAANAN-AAAAANNNN.

The base station may determine whether the user station demodulates corresponding CBGs correctly by performing an OR operation bit-by-bit on the plurality of the HARQ-ACK/NACK of one same TB. For example, in the following example, an OR operation on NANA of the time unit #1 and NNNN of the time unit #3 is performed bit-by-bit, and the result is NANA. For another example, it is assumed that the user terminal demodulates TB0 and TB2 correctly, demodulates the first, second, and fourth CBGs of TB1 of the time unit #1, and also demodulates the third CBG correctly after receiving TB1 of the time unit #3. But the user terminal finds that error occurs in the CRC of the TB, then the fed back HARQ-ACK/NACK is AAAANNNNAAAANNNN.

In the above examples, the last one PDSCH described above indicates that the user terminal may demodulate the PDSCH before the HARQ-ACKs is fed back on the PUCCH/PUSCH and generate the HARQ-ACKs according to the demodulation results. Generally, if the HARQ-ACKs of the PDSCH scheduled by the base station are to be transmitted on a certain PUCCH or PUSCH, the base station will ensure that the time difference between the PDSCH and the PUCCH/PUSCH is not smaller than the processing delay of the user terminal, that is, there is enough time for the user terminal to demodulate the PDSCH and to generate the corresponding HARQ-ACKs. In some embodiments, if the time difference of the base station is smaller than the processing delay, the HARQ-ACKs of such PDSCH may feedback NACKs, or copy the HARQ-ACKs of the previous one PDSCH generating the HARQ-ACKs according to the demodulation results.

In the above embodiment, the uplink/downlink time units may be slots or mini slots. For example, the downlink time unit in which downlink data is received is a slot, and the uplink time unit in which the HARQ-ACK/NACK is fed back is also a slot, or the downlink time unit in which downlink data is received is a mini slot, and the uplink time unit in which the HARQ-ACK/NACK is fed back is also a mini slot, or the downlink time unit in which downlink data is received is a slot, and the uplink time unit in which the HARQ-ACK/NACK is fed back is a mini slot, or the downlink time unit in which downlink data is received is a mini time slot, and the uplink time unit in which the HARQ-ACK/NACK is fed back is a slot. Whether the uplink/downlink time units being slots or mini slots may be determined through configuration by higher-layer signaling or a predefined rule, and may also be indicated through a dynamic signaling.

The method of the above embodiment may also be suitable for the situation of the carrier aggregation, that is, the situation that the base station configures a plurality of serving cells for the user terminal. Accordingly, when a size of the HARQ-ACK/NACK codebook is determined, it not only needs to determine the number of bits of the HARQ-ACK/NACK of each carrier according to the method of the present disclosure, but also needs to determine the total number of bits of the HARQ-ACK/NACK and the mapping method according to the configured plurality of serving cells. For example, in the second exemplary embodiment of the present disclosure, the total number of bits of the HARQ-ACK/NACK of each carrier is determined according to the size of the feedback window for each carrier, and then all carriers, the total number of bits of the HARQ-ACK/NACK codebooks of all the downlink time units and the HARQ-ACK/NACK bit mapping are determined according to the number of carrier number.

FIG. 14 is a flowchart of a downlink transmission method according to the present disclosure. Here, the base station performs a downlink transmission.

Referring to FIG. 14, at step 1401, the base station configures a control signaling.

At step 1402, the base station transmits a PDSCH (Physical Downlink Shared Channel) and the control signaling to a user equipment in a downlink time unit. Here, the control signaling may be used to determine that the user equipment feeds back at least one of the following: an uplink time unit of a HARQ-ACK/NACK (Hybrid Automatic Repeat Request-Acknowledgment/Negative Acknowledgment) corresponding to the PDSCH, a size of a HARQ-ACK/NACK codebook for the uplink time unit, and bit positions where HARQ-ACK/NACKs corresponding to respective downlink time units corresponding to the same uplink time unit are in the HARQ-ACK/NACK codebook.

According to an exemplary embodiment, the control signaling may be a downlink schedule signaling carried by a PDCCH or a control signaling carried by the PDSCH.

According to the exemplary embodiment, the control signaling may include HARQ-ACK/NACK timing.

According to the exemplary embodiment, the HARQ-ACK/NACK timing may be one of: information indicating a time difference between the downlink time unit in which the PDSCH is received and the uplink time unit in which the HARQ-ACK/NACK is fed back, information indicating one or more uplink time units, in which the configured PUCCHs are included, which are greater than or equal to a least time difference between the downlink time unit in which the PDSCH is received and the uplink time unit in which the HARQ-ACK/NACK is fed back and which are closest to the least time difference, and information indicating whether it indicates a time difference between the downlink time unit in which a predefined PDSCH is and the uplink time unit in which the HARQ-ACK/NACK is fed back or one or more uplink time units in which the configured PUCCHs are included, which are greater than or equal to a least time difference between the downlink time unit in which the PDSCH is received and the uplink time unit in which the HARQ-ACK/NACK is fed back and which are closest to the least time difference.

According to the exemplary embodiment, the control signaling may further include a first class DAI, wherein the first class DAI indicates one of the following information: a relative time sequence of the currently scheduled downlink time unit in all the scheduled downlink time units corresponding to the same uplink time unit, and bit positions where the bits of the HARQ-ACK/NACK of the currently scheduled downlink time unit are in the HARQ-ACK/NACK codebook. When the UE is configured to be in a work mode of carrier aggregation, the first class DAI may be counted respectively for respective carriers, like in the existing LTE Rel-8 TDD system, the DAI in the downlink control signaling or the first class DAI is in a mode of frequency first and time later, that is, the counting is firstly performed on the respective scheduled carrier in a same time unit and then on the respective scheduled carriers in a next time unit, like the DAI in the downlink control signaling in the existing LTE Rel-13 carrier aggregation system. The first class DAI may be used to determine the HARQ-ACK codebook dynamically, and also may be used to determine the HARQ-ACK codebook semi-statically.

According to the exemplary embodiment, in the control signaling, the first class DAI and the HARQ-ACK/NACK timing may be joint encoded.

According to the exemplary embodiment, the control signaling may further include a second class DAI, wherein the second class DAI indicates one of the following information: a total number of downlink time units of all the scheduled downlink time units corresponding to the same uplink time unit, a total number of downlink time units from a first downlink time unit to the current downlink time unit among all the scheduled downlink time units corresponding to the same uplink time unit, and a total number of bits of the HARQ-ACK/NACK codebook.

According to the exemplary embodiment, in the control signaling, the first class DAI, the second class DAI and the HARQ-ACK/NACK timing may be joint encoded.

According to the exemplary embodiment, the control signaling may further include information indicating the number of bits of the HARQ-ACK/NACK corresponding to each downlink time unit is determined according to a maximum number of TBs that may be transmitted in each downlink time unit, or according to a maximum number of coding blocks that may be transmitted in each downlink time unit, or according to a maximum number of CBGs that may be transmitted in each downlink time unit.

According to the exemplary embodiment, the control signaling may further include a size of the HARQ-ACK/NACK codebook configured by the base station.

According to the exemplary embodiment, the control signaling may further include information indicating that a time unit in which a PDSCH is not allowed to transmit.

According to the exemplary embodiment, when up to the current downlink time unit, the accumulated total number of bits of uplink control signaling including at least the HARQ-ACK/NACK which need to be fed back in the uplink time unit exceeds a maximum number of bits of uplink control signaling that may be carried by PUCCH resources configured by the base station, the base station may transmit downlink scheduling information indicating new PUCCH resources that may carry the total number of bits of the uplink control signaling which need to be fed back to the user equipment, in the current downlink time unit or at least the last downlink time unit corresponding to the uplink time unit.

FIG. 15 is a block diagram of an apparatus 1500 of transmitting a HARQ-ACK/NACK (Hybrid Automatic Repeat Request-Acknowledgment/Negative Acknowledgment) according to the present disclosure. Here, the user equipment may use the apparatus 1500 transmitting the HARQ-ACK/NACK to transmit the HARQ-ACK/NACK.

Referring to FIG. 15, the apparatus 1500 transmitting the HARQ-ACK/NACK may include a receiving unit 1501, a determining unit 1502, a generating unit 1503 and a transmitting unit 1504.

In specific, the receiving unit 1501 may receive a PDSCH (Physical Downlink Shared Channel) and a control signaling from a base station in downlink time unit(s).

Next, the determining unit 1502 may determine an uplink time unit in which a HARQ-ACK/NACK corresponding to the received PDSCH is fed back, a size of a HARQ-ACK/NACK codebook for the uplink time unit, and bit positions where the HARQ-ACK/NACKs corresponding to respective downlink time units corresponding to the same uplink time unit are in the HARQ-ACK/NACK codebook, based on the control signaling.

Next, the generating unit 1503 may generate the HARQ-ACK/NACK codebook, based on the size of the HARQ-ACK/NACK codebook and the bit positions where the HARQ-ACK/NACKs corresponding to the respective downlink time units corresponding to the same uplink time unit are in the HARQ-ACK/NACK codebook.

At last, the transmitting unit 1504 may transmit the generated HARQ-ACK/NACK codebook in the uplink time unit.

The apparatus 1500 transmitting the HARQ-ACK/NACK may implement the above described respective exemplary embodiments of the present disclosure through the receiving unit 1501, the determining unit 1502, the generating unit 1503 and the transmitting unit 1504. The receiving unit 1501, the determining unit 1502, the generating unit 1503 and the transmitting unit 1504 may implement corresponding functions in the above specifically described respective embodiments, respectively, and please refer to the above described respective embodiments for detailed functions, and detailed descriptions thereof will be omitted.

FIG. 16 is a block diagram of a downlink transmission apparatus 1600 according to the present disclosure. Here, a base station may use the downlink transmission apparatus 1600 of the present disclosure to perform a downlink transmission.

Referring to FIG. 16, the downlink transmission apparatus 1600 may include a configuring unit 1601 and a transmitting unit 1602.

In specific, the configuring unit 1601 configures a control signaling.

The transmitting unit 1602 transmits a PDSCH (Physical Downlink Shared Channel) and a control signaling to a user equipment in a downlink time unit. Here, the control signaling may be used to determine that the user equipment feeds back at least one of the following: an uplink time unit of a HARQ-ACK/NACK (Hybrid Automatic Repeat Request-Acknowledgment/Negative Acknowledgment) corresponding to the PDSCH, a size of a HARQ-ACK/NACK codebook for the uplink time unit, and bit positions where the HARQ-ACK/NACKs corresponding to respective downlink time units corresponding to the same uplink time unit are in the HARQ-ACK/NACK codebook.

According to an exemplary embodiment, the control signaling may be a downlink schedule signaling carried by a PDCCH or a control signaling carried by the PDSCH.

According to the exemplary embodiment, the control signaling may include HARQ-ACK/NACK timing.

According to the exemplary embodiment, the HARQ-ACK/NACK timing may be one of: information indicating a time difference between the downlink time unit in which the PDSCH is received and the uplink time unit in which the HARQ-ACK/NACK is fed back, information indicating one or more uplink time units, in which the configured PUCCHs are included, which are greater than or equal to a least time difference between the downlink time unit in which the PDSCH is received and the uplink time unit in which the HARQ-ACK/NACK is fed back and which are closest to the least time difference, and information indicating whether it indicates a time difference between the downlink time unit in which a predefined PDSCH is and the uplink time unit in which the HARQ-ACK/NACK is fed back or one or more uplink time units in which the configured PUCCHs are included, which are greater than or equal to a least time difference between the downlink time unit in which the PDSCH is received and the uplink time unit in which the HARQ-ACK/NACK is fed back and which are closest to the least time difference.

According to the exemplary embodiment, the control signaling may further include a first class DAI, wherein the first class DAI indicates one of the following information: relative time sequence of the currently scheduled downlink time unit in all the scheduled downlink time units corresponding to the same uplink time unit, and bit positions where HARQ-ACK/NACK bits of the currently scheduled downlink time unit are in the HARQ-ACK/NACK codebook.

According to the exemplary embodiment, in the control signaling, the first class DAI and the HARQ-ACK/NACK timing may be joint encoded.

According to the exemplary embodiment, the control signaling may further include a second class DAI, wherein the second class DAI indicates one of the following information: a total number of downlink time units of all the scheduled downlink time units corresponding to the same uplink time unit, a total number of downlink time units from a first downlink time unit to the current downlink time unit among all the scheduled downlink time units corresponding to the same uplink time unit, and a total number of bits of the HARQ-ACK/NACK codebook.

According to the exemplary embodiment, in the control signaling, the first class DAI, the second class DAI and the HARQ-ACK/NACK timing may be joint encoded.

According to the exemplary embodiment, the control signaling may further include information indicating the number of bits of the HARQ-ACK/NACK corresponding to each downlink time unit is determined according to a maximum number of TBs may be transmitted in each downlink time unit, or according to a maximum number of coding blocks that may be transmitted in each downlink time unit, or according to a maximum number of CBGs that may be transmitted in each downlink time unit.

According to the exemplary embodiment, the control signaling may further include a size of the HARQ-ACK/NACK codebook configured by the base station.

According to the exemplary embodiment, the control signaling may further include information indicating that a time unit in which a PDSCH is not allowed to transmit.

According to the exemplary embodiment, when up to the current downlink time unit, the accumulated total number of bits of uplink control signaling including at least the HARQ-ACK/NACK which need to be fed back in the uplink time unit exceeds a maximum number of bits of uplink control signaling that may be carried by PUCCH resources configured by the base station, the transmitting unit 1602 may transmit downlink scheduling information indicating new PUCCH resources that may carry the total number of bits of the uplink control signaling which need to be fed back to the user equipment, in the current downlink time unit or at least the last downlink time unit corresponding to the uplink time unit.

According to the method and apparatus of that transmitting the HARQ-ACK/NACK by the user equipment and the method and apparatus of transmitting the HARQ by the base station of the present disclosure, in the case where the HARQ-ACK feedback time is variable, the user equipment may figure out a size and bit mapping of the HARQ-ACK/NACK codebook exactly, and the uplink control channel resources may be effectively utilized.

The above described embodiments are only parts of embodiments of the present disclosure, it should be pointed out that, to those ordinary skilled persons in the technical field, on the premise without departing from the principle of the present disclosure, several improvements and modifications may also be made, and these improvements and modifications should also be regarded to be fell into the protection scope of the present disclosure.

The invention claimed is:

1. A method for transmitting a hybrid automatic repeat request-acknowledgment/negative acknowledgment (HARQ-ACK/NACK) by a user equipment (UE) in a wireless communication system, the method comprising:

receiving, from a base station, configuration information through higher layer signaling, the configuration information indicating a first set including at least one HARQ-ACK/NACK timing value, wherein each timing value in the first set of the at least one HARQ-ACK/NACK timing value indicates a time difference between a downlink time unit and a single uplink time unit in which a HARQ-ACK/NACK feedback is transmitted;

determining, based on the first set of the at least one HARQ-ACK/NACK timing value, a second set including at least one downlink time unit for physical downlink shared channel (PDSCH) reception, such that at least one HARQ-ACK/NACK for the at least one downlink time unit included in the second set is transmitted in the single uplink time unit, wherein the at least one downlink time unit corresponds to the at least one HARQ-ACK/NACK timing value, respectively;

generating a codebook for the HARQ-ACK/NACK feedback based on a size of the codebook, wherein the size of the codebook is identified based on a size of the second set and a number of one or more HARQ-ACK/NACK bits corresponding to each downlink time unit included in the second set; and transmitting, to the base station, the codebook for the HARQ-ACK/NACK feedback in the single uplink time unit.

2. The method of claim 1, wherein the size of the codebook is identified after
removing time units which are configured as uplink time unit from the second set.

3. The method of claim 1, further comprising:
receiving, from the base station, downlink control information (DCI) including information indicating one value among the at least one HARQ-ACK/NACK timing value,
wherein the one value indicates a time difference between a downlink time unit in which a PDSCH scheduled by the DCI is received and the uplink unit, and
wherein each information bit of the codebook for the HARQ-ACK/NACK feedback indicates a HARQ-ACK/NACK result in a downlink time unit included in the second set.

4. The method of claim 1, wherein the downlink time unit is a slot, and the uplink time unit is a slot.

5. The method of claim 1, wherein, if a scheduling is based on code block group (CBG), the number of one or more HARQ-ACK/NACK bits corresponding to each downlink time unit is determined based on a maximum number of CBGs in one transmission block (TB).

6. The method of claim 5, wherein the number of one or more HARQ-ACK/NACK bits corresponding to each downlink time unit is determined based on a parameter received from the base station via the higher layer signaling, and
wherein the parameter includes at least one of a maximum number of TBs in each downlink time unit or the maximum number of CBGs in one TB.

7. The method of claim 6, wherein:
if a spatial bundling is disabled and a scheduling is based on TB, the number of one or more HARQ-ACK/NACK bits corresponding to each downlink time unit is determined based on two bits, and
if the spatial bundling is enabled, the number of one or more HARQ-ACK/NACK bits corresponding to each downlink time unit is determined based on one bit.

8. An apparatus for transmitting a hybrid automatic repeat request-acknowledgment/negative acknowledgment (HARQ-ACK/NACK) in a wireless communication system, the apparatus comprising:
at least one processor configured to:
receive, from a base station, configuration information through higher layer signaling, the configuration information indicating at least one HARQ-ACK/NACK timing value based on at least one of a higher layer signaling from a base station or a pre-configuration, wherein each timing value in the first set of the at least one HARQ-ACK/NACK timing value indicates a time difference between a downlink time unit and a single uplink time unit in which a HARQ-ACK/NACK feedback is transmitted;

determine, based on the first set of the at least one HARQ-ACK/NACK timing value, a second set including at least one downlink time unit for physical downlink shared channel (PDSCH) reception, such that at least one HARQ-ACK/NACK for the at least one downlink time unit included in the second set is transmitted in the single uplink time unit, wherein the at least one downlink time unit corresponds to the at least one HARQ-ACK/NACK timing value, respectively; and generate a codebook for the HARQ-ACK/NACK feedback based on a size of the codebook, wherein the size of the codebook is identified based on a size of the second set and a number of one or more HARQ-ACK/NACK bits corresponding to each downlink time unit included in the second set; and a transceiver configured to transmit, to the base station, the codebook for the HARQ-ACK/NACK feedback in the single uplink time unit.

9. The apparatus of claim 8, wherein the size of the codebook is identified after removing time units which are configured as uplink time unit from the second set.

10. The apparatus of claim 8, wherein:
the transceiver is further configured to receive, from the base station, downlink control information (DCI) including information indicating one value among the at least one HARQ-ACK/NACK timing value,
the one value indicates a time difference between a downlink time unit in which a PDSCH scheduled by the DCI is received and the uplink unit, and
each information bit of the codebook for the HARQ-ACK/NACK feedback indicates a HARQ-ACK/NACK result in a downlink time unit included in the second set.

11. The apparatus of claim 8, wherein the downlink time unit is a slot, and the uplink time unit is a slot.

12. The apparatus of claim 8, wherein if a scheduling is based on code block group (CBG), the number of one or more HARQ-ACK/NACK bits corresponding to each downlink time unit is determined based on a maximum number of CBGs in one transmission block (TB).

13. The apparatus of claim 12, wherein the number of one or more HARQ-ACK/NACK bits corresponding to each downlink time unit is determined based on a parameter received from the base station via the higher layer signaling; and
wherein the parameter includes at least one of a maximum number of TBs in each downlink time unit or the maximum number of CBGs in one TB.

14. The apparatus of claim 13, wherein:
if a spatial bundling is disabled and a scheduling is based on TB, the number of one or more HARQ-ACK/NACK bits corresponding to each downlink time unit is determined based on two bits, and
if the spatial bundling is enabled, the number of one or more HARQ-ACK/NACK bits corresponding to each downlink time unit is determined based on one bit.

* * * * *